(12) United States Patent
Bak et al.

(10) Patent No.: US 10,035,604 B2
(45) Date of Patent: Jul. 31, 2018

(54) VERTICAL TAKE-OFF AND LANDING AIRCRAFT USING HYBRID-ELECTRIC PROPULSION SYSTEM

(71) Applicant: HANKUK CARBON CO., LTD., Miryang-si, Gyeongsangnam-do (KR)

(72) Inventors: Jeong-Gyu Bak, Seoul (KR); Jinsoo Cho, Seoul (KR); Boseong Kim, Yongin-si (KR); Senghyun Yun, Anyang-si (KR); Sunghong Won, Seongnam-si (KR); Tae-Chul Jeong, Seoul (KR); Sooyoung Cho, Seoul (KR); Geunho Lee, Seoul (KR); Kyusung Park, Seoul (KR); Juhyung Ha, Seoul (KR); Changmo Moon, Seoul (KR); Sunho Beck, Jinju-si (KR); Changjun Meang, Seoul (KR); Hanki Lee, Seoul (KR); Minjun Kim, Seoul (KR); Dain Lee, Seoul (KR)

(73) Assignee: HANKUK CARBON CO., LTD., Miryang-si (KR)

( * ) Notice: Subject to any disclaimer, the term of this patent is extended or adjusted under 35 U.S.C. 154(b) by 0 days.

(21) Appl. No.: 15/898,203

(22) Filed: Feb. 15, 2018

(65) Prior Publication Data
US 2018/0178921 A1 Jun. 28, 2018

Related U.S. Application Data

(63) Continuation of application No. 15/321,699, filed as application No. PCT/KR2016/007760 on Jul. 15, 2016, now Pat. No. 9,932,118.

(30) Foreign Application Priority Data
Jul. 17, 2015 (KR) .......................... 10-2015-0101979

(51) Int. Cl.
*B60W 30/00* (2006.01)
*B64D 27/24* (2006.01)
(Continued)

(52) U.S. Cl.
CPC .......... *B64D 27/24* (2013.01); *B64C 29/0025* (2013.01); *B64C 29/0033* (2013.01);
(Continued)

(58) Field of Classification Search
None
See application file for complete search history.

(56) References Cited

U.S. PATENT DOCUMENTS 4,610,410 A * 9/1986 Sibley ...................... B64C 9/38
244/12.5
4,955,560 A * 9/1990 Nishina .................. B64D 27/24
244/53 R
(Continued)

FOREIGN PATENT DOCUMENTS

CA 2903986 A1 9/2014
CN 103982352 A 8/2014
(Continued)

OTHER PUBLICATIONS

European Search Report dated Apr. 20, 2018 in application No. 16828012.1.

*Primary Examiner* — Jonathan M Dager
(74) *Attorney, Agent, or Firm* — Maschoff Brennan

(57) ABSTRACT

A vertical take-off and landing aircraft using a hybrid electric propulsion system includes an engine, a generator that produces electric power using power supplied by the engine, and a battery that stores the produced electric power. A motor receives the electric power stored in the battery and electric power produced by the generator but not stored in the battery and provides the power to a thrust generating
(Continued)

apparatus. A controller selects either silence mode or normal mode, and determines the amount of electric power stored in the battery and the amount of electric power not stored in the battery from the electric power supplied to the motor. In the silence mode, the controller supplies only the electric power stored in the battery and controls a duration by adjusting output power of motor. In the normal mode, the controller supplies electric power not stored in the battery.

20 Claims, 15 Drawing Sheets

(51) Int. Cl.
    *B64D 31/06*     (2006.01)
    *B64D 35/02*     (2006.01)
    *B64C 29/00*     (2006.01)
    *B64D 27/02*     (2006.01)

(52) U.S. Cl.
    CPC ............ *B64D 27/02* (2013.01); *B64D 31/06* (2013.01); *B64D 35/02* (2013.01); *B64D 2027/026* (2013.01); *B64D 2221/00* (2013.01)

(56) References Cited

U.S. PATENT DOCUMENTS

| | | | | |
|---|---|---|---|---|
| 5,823,468 | A * | 10/1998 | Bothe | B64B 1/08 244/2 |
| 6,293,491 | B1 * | 9/2001 | Wobben | B64C 27/00 244/17.23 |
| 8,041,471 | B2 * | 10/2011 | Ishiba | B64C 39/024 244/17.11 |
| 8,469,306 | B2 * | 6/2013 | Kuhn, Jr. | B64C 29/0033 244/12.4 |
| 8,757,542 | B2 * | 6/2014 | Hopdjanian | B60L 3/0046 244/53 R |
| 8,851,415 | B1 * | 10/2014 | Lugg | B64C 27/32 244/17.11 |
| 9,004,395 | B2 * | 4/2015 | Botti | B64C 27/14 244/17.11 |
| 9,162,771 | B2 * | 10/2015 | Roggemans | B64D 31/14 |
| 9,174,728 | B2 * | 11/2015 | Altmikus | B64C 27/82 |
| 9,180,964 | B2 * | 11/2015 | Smith | B64C 27/006 |
| 9,187,174 | B2 * | 11/2015 | Shaw | B64C 27/28 |
| 9,194,285 | B2 * | 11/2015 | Botti | B64D 27/24 |
| 9,586,690 | B2 * | 3/2017 | Rajashekara | B64C 11/305 |
| 9,708,059 | B2 * | 7/2017 | Logan | B64C 39/024 |
| 2002/0145076 | A1 * | 10/2002 | Alford | B64C 27/006 244/60 |
| 2003/0094537 | A1 * | 5/2003 | Austen-Brown | B64C 27/28 244/7 R |
| 2004/0245374 | A1 * | 12/2004 | Morgan | B64C 5/02 244/12.3 |
| 2006/0219447 | A1 | 10/2006 | Saitou et al. | |
| 2007/0057113 | A1 * | 3/2007 | Parks | B64C 15/00 244/12.5 |
| 2007/0191180 | A1 * | 8/2007 | Yang | B60K 6/387 477/5 |
| 2008/0184906 | A1 * | 8/2008 | Kejha | B64C 39/024 102/374 |
| 2009/0140095 | A1 * | 6/2009 | Sirohi | B64C 27/22 244/17.19 |
| 2009/0145998 | A1 * | 6/2009 | Salyer | B64C 27/04 244/17.23 |
| 2009/0293494 | A1 * | 12/2009 | Hoffjann | B64D 27/02 60/780 |
| 2010/0038473 | A1 * | 2/2010 | Schneider | B64D 27/24 244/60 |
| 2010/0064689 | A1 * | 3/2010 | Reinhardt | B64D 27/24 60/706 |
| 2010/0072318 | A1 * | 3/2010 | Westenberger | B64D 27/02 244/54 |
| 2010/0147993 | A1 * | 6/2010 | Annati | B64C 27/20 244/12.2 |
| 2011/0073717 | A1 * | 3/2011 | Foucault | B64D 27/24 244/53 R |
| 2011/0108663 | A1 * | 5/2011 | Westenberger | B64D 27/02 244/60 |
| 2011/0121127 | A1 * | 5/2011 | Certain | B64C 27/12 244/17.19 |
| 2012/0056040 | A1 * | 3/2012 | Brotherton-Ratcliffe | B64C 27/20 244/23 A |
| 2013/0062455 | A1 * | 3/2013 | Lugg | B64C 29/0025 244/12.3 |
| 2013/0092789 | A1 * | 4/2013 | Botti | B64C 27/14 244/54 |
| 2013/0099065 | A1 | 4/2013 | Stuhlberger | |
| 2013/0140404 | A1 * | 6/2013 | Parks | G05D 1/102 244/23 A |
| 2014/0010652 | A1 * | 1/2014 | Suntharalingam | B64D 27/02 416/1 |
| 2014/0054411 | A1 * | 2/2014 | Connaulte | B64C 27/006 244/17.13 |
| 2014/0117148 | A1 * | 5/2014 | Dyrla | B64C 27/14 244/17.13 |
| 2014/0339372 | A1 | 11/2014 | Dekel et al. | |
| 2014/0346283 | A1 * | 11/2014 | Salyer | B64C 37/00 244/7 A |
| 2015/0013306 | A1 * | 1/2015 | Shelley | F02K 5/00 60/224 |
| 2015/0115108 | A1 * | 4/2015 | Benson | B60L 11/1809 244/53 R |
| 2015/0151844 | A1 * | 6/2015 | Anton | B64C 31/024 244/55 |
| 2015/0197335 | A1 | 6/2015 | Dekel et al. | |
| 2016/0107748 | A1 * | 4/2016 | Luyks | B64C 27/12 416/95 |
| 2016/0236790 | A1 * | 8/2016 | Knapp | B64C 11/001 |
| 2017/0057650 | A1 * | 3/2017 | Walter-Robinson | B64D 41/00 |
| 2017/0072755 | A1 * | 3/2017 | Zhou | B64C 29/0033 |
| 2017/0247114 | A1 * | 8/2017 | Moulon | B64D 27/02 |
| 2017/0320585 | A1 * | 11/2017 | Armstrong | B64D 31/00 |

FOREIGN PATENT DOCUMENTS

| | | |
|---|---|---|
| EP | 2551198 A1 | 1/2013 |
| JP | 2010-137844 A | 6/2010 |
| KR | 10-2014-0114875 A | 9/2014 |
| KR | 10-2015-0048661 A | 5/2015 |
| KR | 10-2015-0058197 A | 5/2015 |
| WO | 2014/182616 A2 | 11/2014 |
| WO | 2014/182616 A3 | 11/2014 |
| WO | 2016/093905 A1 | 6/2016 |

* cited by examiner

VERTICAL TAKE-OFF AND LANDING AIRCRAFT USING HYBRID-ELECTRIC PROPULSION SYSTEM

CROSS-REFERENCE TO RELATED APPLICATIONS

This application is a continuation of U.S. patent application Ser. No. 15/321,699, which is the U.S. national stage of international patent application no. PCT/KR2016/007760, filed Jul. 15, 2016, which claims priority to Korean patent application 10-2015-0101979, filed Jul. 17, 2015. The foregoing applications are incorporated herein by reference.

BACKGROUND

Field of the Invention

The following embodiments relate to a vertical take-off and landing (VTOL) aircraft using a hybrid-electric propulsion system.

Description of Related Art

A vertical take-off and landing aircraft based on a rotary wing, such as a helicopter, does not need separate takeoff and landing facilities and equipment, but has lower high-speed flight performance, high-altitude performance, and flight endurance performance than an equivalent fixed-wing aircraft. Compared to a fixed-wing aircraft for which various propulsion systems—from an electric motor to a jet engine—are possible, a vertical take-off and landing (VTOL) aircraft which depends only on the shaft horsepower of an engine has a limited selection of appropriate propulsion systems as the weight of the aircraft decreases. In particular, a reciprocating engine that is widely used in a small aircraft with a maximum take-off weight (MTOW) of about 10 Kg to about 300 Kg has a very small output-to-weight ratio of about 2. Therefore, in order to supply power needed for vertical take-off and landing, an engine needs to be very bulky, and the propulsion system is excessively heavier compared to an empty weight of the aircraft. Thus, it is difficult to obtain a payload and endurance time required for a mission. Therefore, a propulsion system using a battery and an electric motor is widely used in a small aircraft. However, due to limitations of the current technology on batteries with low energy density, it is impossible to provide sufficient endurance time required for a mission.

A long endurance flight requires an energy source with high specific energy and a power device capable of converting the said energy where as a vertical take-off and landing requires an energy source with high specific power and a device capable of converting the said power.

However, an energy source or a power generating device with both high specific energy and high specific power doesn't exist, so in general, an energy source and a power generating device with high specific energy are installed in an aircraft. Since vertical take-off and landing of an aircraft need much energy, and a propulsion system including a power generating device should be designed to supply sufficient power even during the vertical take-off and landing, such a configuration significantly increases the total weight of the propulsion system beyond the weight needed for a flight, causing an increase in weight of the aircraft and inefficiency of the propulsion system.

Recent and continuing efforts include utilizing an energy source with high specific energy and an energy source with high specific power at the same time to decrease the weight of the propulsion system, increase efficiency, and provide longer endurance time.

SUMMARY OF THE INVENTION

The hybrid vertical take-off and landing aircraft according to an embodiment may determine required power on the basis of the current position of a thrust generating apparatus, thus providing high flight efficiency.

The hybrid vertical take-off and landing aircraft according to an embodiment may supply only electric power stored in the battery to a motor in silence mode, thus providing low-noise flight without noise generated by an engine and a generator (or, an alternator).

The hybrid vertical take-off and landing aircraft according to an embodiment may control a first thrust generating apparatus that receives power from the engine and a second thrust generating apparatus that receives electric power produced by the generator depending on vertical flight or horizontal flight, thus providing high flight efficiency.

The hybrid vertical take-off and landing aircraft according to an embodiment may include an engine, a generator configured to produce electric power using power supplied by the engine, a battery configured to store the electric power produced by the generator, a motor configured to receive at least one of the electric power stored in the battery and electric power produced by the generator but not stored in the battery and provide the power to at least one thrust generating apparatus, and a controller configured to select either silence mode or normal mode, and determine the amount of electric power stored in the battery and the amount of electric power not stored in the battery from the electric power supplied to the motor, based on the selected mode, wherein, in the silence mode, the controller configured to supply only the electric power stored in the battery to the motor, and control a duration by adjusting output power of motor, and wherein, in the normal mode, the controller configured to supply electric power not stored in the battery to the motor.

Technical solutions of the present invention are not limited to the aforesaid, and other technical solutions that are not described herein would be clearly understood by those skilled in the art from the following description and the accompanying drawings.

The hybrid vertical take-off and landing aircraft according to an embodiment may determine required power on the basis of the current position of a thrust generating apparatus, thus providing high flight efficiency.

The hybrid vertical take-off and landing aircraft according to an embodiment may supply only electric power stored in the battery to a motor in the silence mode, thus providing low-noise flight without noise generated by an engine and a generator The hybrid vertical take-off and landing aircraft according to an embodiment may control a first thrust generating apparatus that receives power from the engine and a second thrust generating apparatus that receives electric power produced by the generator depending on vertical flight or horizontal flight, thus providing high flight efficiency.

DETAILED DESCRIPTION OF THE INVENTION

Figure 1:
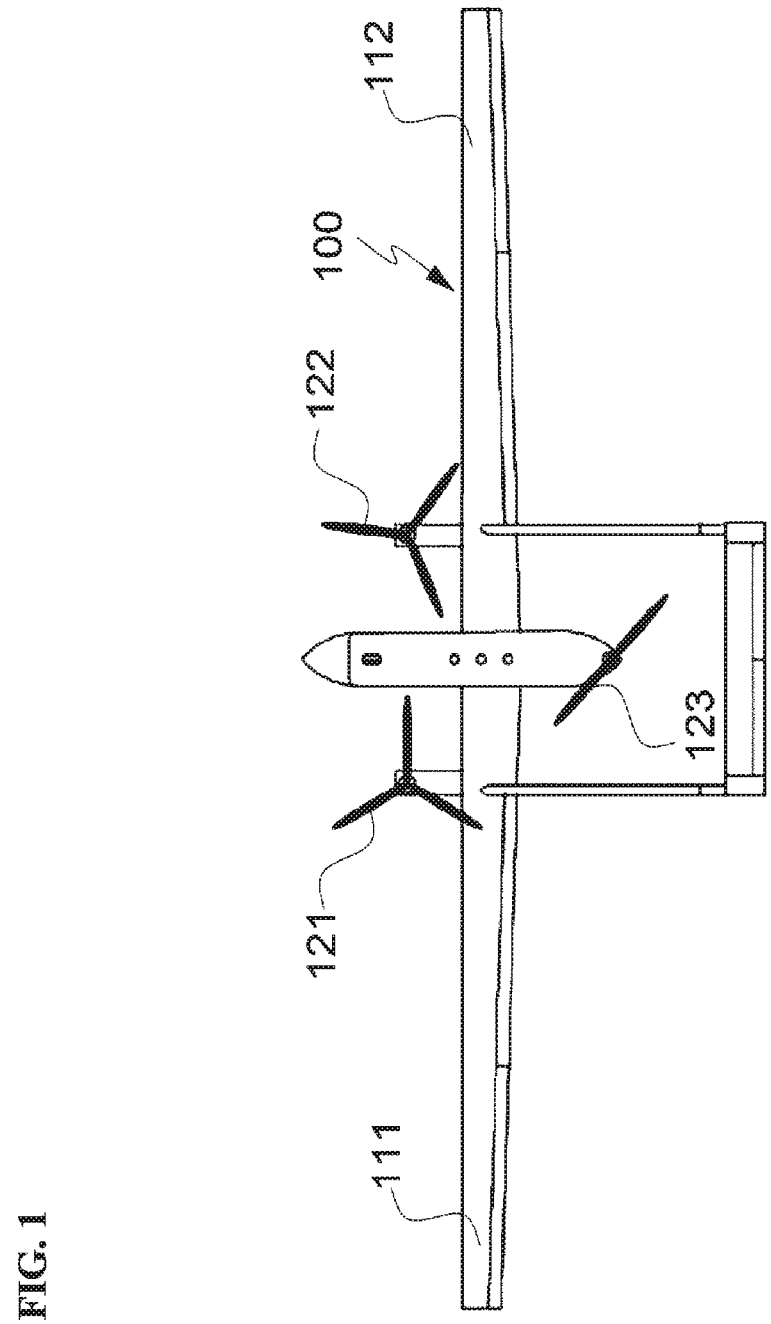
FIG. 1 is a diagram for describing a hybrid vertical take-off and landing aircraft according to an embodiment.

The hybrid vertical take-off and landing aircraft according to an embodiment may include an engine, a generator configured to produce electric power using power supplied by the engine, a battery configured to store the electric power produced by the generator, a motor configured to receive at least one of the electric power stored in the battery and electric power produced by the generator but not stored in the battery and provide the power to at least one thrust generating apparatus, and a controller configured to select either silence mode or normal mode, and determine the amount of electric power stored in the battery and the amount of electric power not stored in the battery from the electric power supplied to the motor, based on the selected mode, wherein, in the silence mode, the controller configured to supply only the electric power stored in the battery to the motor, and control a duration by adjusting output power of motor, and wherein, in the normal mode, the controller configured to supply electric power not stored in the battery to the motor.

Hereinafter, embodiments will be described in detail with reference to the accompanying drawings. However, the present invention is not restricted or limited to the embodiments. Also, like reference numerals in the drawings denote like elements.

1. Hybrid Vertical Take-Off and Landing Aircraft

FIG. 1 is a diagram for describing a hybrid vertical take-off and landing aircraft according to an embodiment.

Referring to FIG. 1, a hybrid vertical take-off and landing (a hybrid VTOL) aircraft 100 may be represented as an aircraft having wings that performs take-off and landing in a vertical direction and generates lift force. Thus, the hybrid vertical take-off and landing aircraft 100 can take off and land without needing a runway. The hybrid vertical take-off and landing aircraft 100 may include fixed wings 111 and 112 that are fixed on the body of the aircraft and rotary wings 121, 122, and 123 that rotationally move to generate thrust. For example, the rotary wings 121, 122, and 123 may include a propeller, a rotor, or a ducted fan. The hybrid vertical take-off and landing aircraft 100 may have a larger flight range and a longer flight time than a rotary-wing aircraft such as a helicopter. Also, the hybrid vertical take-off and landing aircraft 100 may not need an additional take-off and landing apparatus, such as a catapult.

Also, the hybrid vertical take-off and landing aircraft 100 may require more power than a fixed-wing aircraft during take-off and landing. Thus, the hybrid vertical take-off and landing aircraft 100 may use a high specific power battery.

In an embodiment, the hybrid vertical take-off and landing aircraft 100 may supply power to the rotary wings 121, 122, and 123 by a hybrid method. Here, the hybrid method may include a serial hybrid method, a parallel hybrid method, and a mixed hybrid method.

In the hybrid vertical take-off and landing aircraft 100, the serial hybrid method is a method of driving the rotary wings 121, 122, and 123 using an electric motor. In this method, an engine may supply power to a generator (or, an alternator) the generator may produce electric power using the power supplied from the engine, and the motor may drive the rotary wings 121, 122, and 123 using the electric power produced by the generator.

In the hybrid vertical take-off and landing aircraft 100, the parallel hybrid method is a method of driving the rotary wings 121, 122, and 123 using an engine and a motor. In this method, a generator may produce electric power using power supplied from an engine, and the motor may drive the rotary wings 121, 122, and 123 using the power produced by the generator. In addition, the engine may drive the rotary wings 121, 122, and 123 using the power of the engine.

In the hybrid vertical take-off and landing aircraft 100, the mixed hybrid method mixes the serial hybrid method and the parallel hybrid method. In this method, some of the rotary wings 121, 122, and 123 may be driven in the serial hybrid method, and the others may be driven in the parallel hybrid method.

In an embodiment, according to a flight operation of the hybrid vertical take-off and landing aircraft 100, the rotary wings 121 and 122 may be tilted. As an example, the rotary wings 121 and 122 may be tilted upward when the hybrid vertical take-off and landing aircraft 100 is taking off or landing vertically and may be tilted forward when the hybrid vertical take-off and landing aircraft 100 is flying horizontally.

A configuration, an operation, and an example of the hybrid vertical take-off and landing aircraft 100 will be described in detail below.

2. Serial-Type Hybrid Vertical Take-Off and Landing Aircraft

Figure 2:
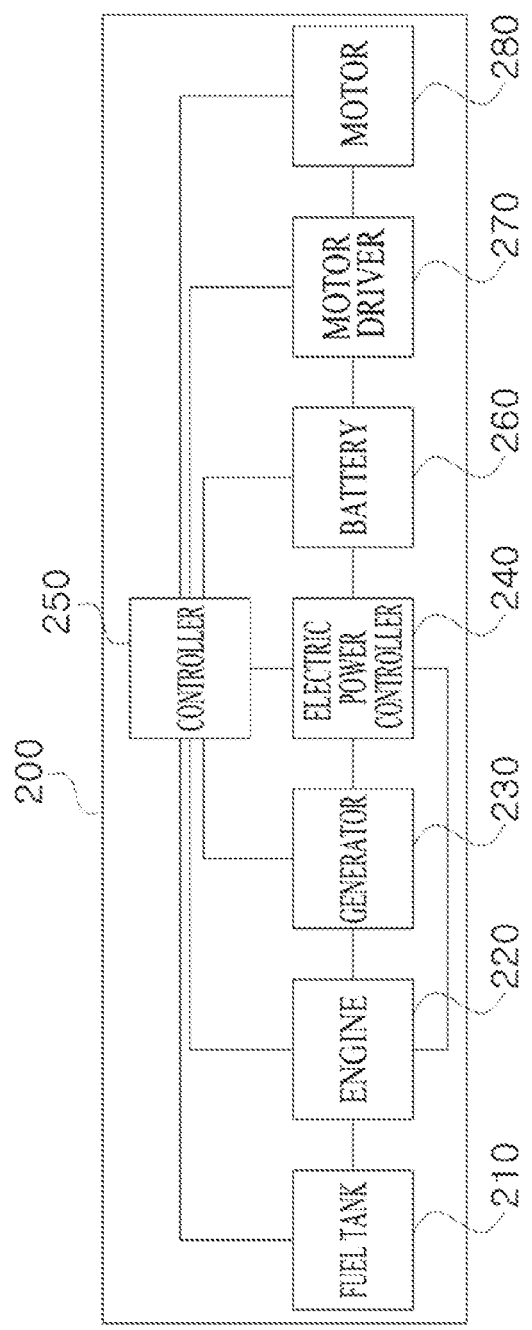
FIG. 2 is a block diagram showing a propulsion system of a hybrid vertical take-off and landing aircraft according to an embodiment.

FIG. 2 is a block diagram showing a propulsion system of a hybrid vertical take-off and landing aircraft according to an embodiment.

Referring to FIG. 2, a propulsion system 200 of the hybrid vertical take-off and landing aircraft may include a fuel tank 210, an engine 220, a generator 230, an electric power controller 240, a controller 250, a battery 260, a motor driver 270, and a motor 280. Also, the propulsion system 200 may further include a propeller. Since the propulsion system 200 is of the serial hybrid method, the propeller may be driven by the motor 280 having electric power as a power source, instead of being supplied with power from the engine 220.

The fuel tank 210 may supply fuel to the engine 220. The fuel tank 210 may be variously designed to have a capacity range that may satisfy a target flight time. Also, the fuel tank 210 may be designed not to incur damage or fuel leakage in all conditions that may occur while the aircraft is carrying out a mission.

The engine may burn the fuel supplied from the fuel tank 210 to generate mechanical power. In the serial hybrid method, the engine 220 may be driven to provide power that is used by a generator to produce electric power.

Output power of the engine 220 may be variously designed in a range of output power that may sufficiently supply power needed for safe flight of the hybrid vertical take-off and landing aircraft. Also, the engine 220 may be turned on or off by the generator 230.

The generator 230 may produce electric power using the power supplied from the engine 220. In an embodiment, the generator 230 may be an integrated starter and generator (ISG). Also, the generator 230 may convert the power of the engine 220 into electrical energy and may convert the electric energy into mechanical energy. In this case, the generator 230 may convert the power of the engine 220 into 3-phase AC electric power. In this case, a line-to-line voltage of the 3-phase AC electric power may be lower than a voltage of the battery 260. Also, the generator 230 may control the supply of power to the engine 220 to control the startup of the engine 220. For example, the generator 230 may block the supply of power to the engine 220 to turn off the engine 220 when the generator 230 does not produce electric power and may supply power to the engine 220 to turn on the engine 220 when the generator 230 produces electric power.

The electric power controller 240 may control electric power produced and supplied by the propulsion system 200. The electric power controller 240 may be represented as a power management unit (PMU) or a power controller (PCU). The electric power controller 240 may monitor the amount of electric power required by the propulsion system 200 and may control the generator 230 to supply the power required by the propulsion system 200 on the basis of a result of the monitoring.

In an embodiment, the electric power controller 240 may include a converter configured to convert AC electric power into DC electric power. For example, the converter may include a 3-phase inverter, which may convert 3-phase AC electric power produced by a generator into DC electric power. The electric power controller 240 may supply the DC electric power to the battery 260 or an auxiliary battery. For example, the electric power controller 240 may control the supply such that the DC electric power supplied to the battery 260 is less than the DC electric power supplied to the auxiliary battery. Also, the electric power controller 240 may directly supply the DC electric power to the motor 280.

Also, the electric power controller 240 may determine whether the generator 230 will produce electric power by considering the amount of electric power stored in the battery 260, the amount of electric power to be supplied to the motor, etc.

Also, the electric power controller 240 may control a throttle of the engine 220 and the generator 230 to control the startup of the engine 220. For example, the electric power controller 240 may control a throttle signal of the engine 220 through a converter (e.g., a 3-phase inverter) to adjust revolutions per minute (RPM) of the engine 220 and may control torque of the generator 230 through the converter.

Also, the electric power controller 240 may monitor information regarding a fuel level indicating the remaining amount of fuel in the fuel tank 210, RPM of the engine 220, a rotor position of the generator 230, a voltage and current of power generated by the generator 230, and a voltage and current provided to the motor driver 270 by the battery 260.

The controller 250 may control elements associated with the flight of the propulsion system 200. In an embodiment, the controller 250 may control the fuel tank 210, the engine 220, the generator 230, the electric power controller 240, the battery 260, and the motor driver 270. The controller 250 may monitor battery state such as the fuel level of the fuel tank 210, the amount of electric power stored in the battery 260, and temperature of the battery 260. Also, the controller 250 may include a communication system, an identification system, a navigation system, an autopilot apparatus, an electronic aircraft management system, an anti-collision system, a radar system, etc. The controller 250 may be represented as avionics.

In the block diagram shown in FIG. 2, the controller 250 and the electric power controller are shown as being separate from each other, but are not limited thereto. Accordingly, the controller 250 and the electric power controller 240 may be configured as one unit.

The battery 260 may store the DC electric power obtained by the conversion of the electric power controller 240 and may supply the stored DC electric power in the motor 280. In an embodiment, the battery 260 may be a lithium polymer (LiPo) battery and may include a plurality of cells. Also, the battery 260 may be controlled by a battery management system (BMS). The battery 260 and the BMS will be described in detail with reference to FIG. 3.

The motor driver 270 may control the motor 280. In an embodiment, the motor driver 270 may receive a control signal from the controller 250 or the electric power controller 240 and may control the motor 280 according to the received control signal.

The motor 280 may receive electric power from at least one of the electric power controller 240 and the battery 260 and may drive the propeller of the hybrid vertical take-off and landing aircraft.

In an embodiment, the motor 280 may be a brushless DC electric motor (BLDC motor) or a permanent-magnet synchronous motor (PMSM).

Figure 3:
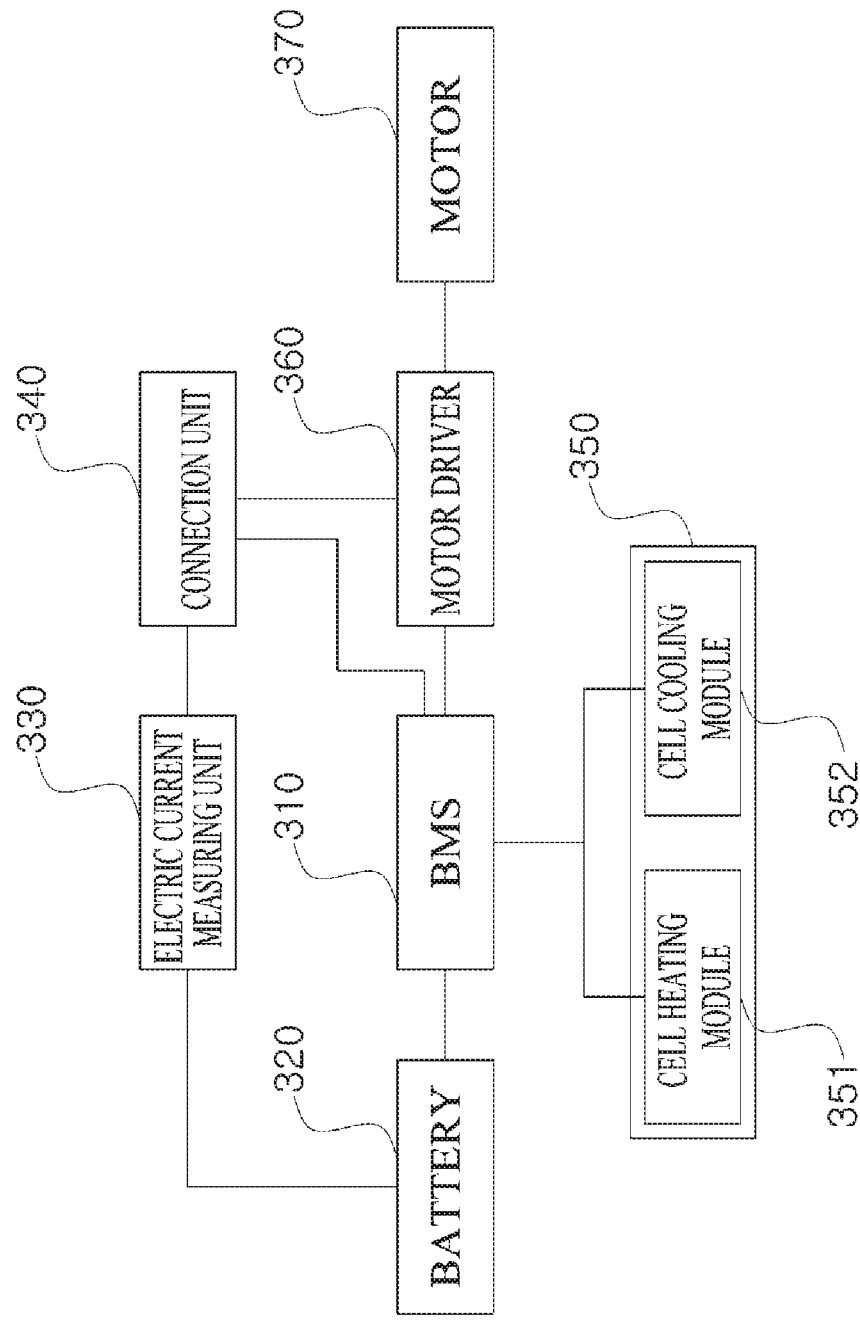
FIG. 3 is a diagram for describing a battery management system (BMS) according to an embodiment.

FIG. 3 is a diagram for describing a battery management system (BMS) according to an embodiment.

Referring to FIG. 3, the BMS 310 may monitor a state of the battery 320 and may control the battery 320. The BMS 310 may perform a control such that charging states and cell voltages are equal among a plurality of battery cells included in the battery 320. Also, the BMS 310 may control temperature of the battery 320 using a cell heating module 351 and a cell cooling module 352 of the temperature control module 350. In an embodiment, in order to maintain performance of the battery 320, the BMS 310 may control temperature of the battery 320 by considering altitude variation of the hybrid vertical take-off and landing aircraft.

Also, the BMS 310 may prevent overcharging of the battery 320. In an embodiment, the battery 320 may supply electric power to a motor 370 through an electric current measuring unit 330, a connection unit 340, and a motor driver 360. The electric current measuring unit 330 may measure a level of an electric current supplied from the battery 320 to the motor 370. When the electric current level measured by the electric current measuring unit 330 is less than or equal to a predetermined threshold amount, the BMS 310 may control the connection unit 340 to be turned on and may control the motor 370 to receive electric power from the battery 320. When the electric current level measured by the electric current measuring unit 330 exceeds the predetermined threshold amount, the BMS 310 may control the connection unit 340 to be turned off to block the supply of electric power to the motor 370 of the battery 320 in order to prevent overcharging.

Also, the BMS 310 may estimate a state of health (SoH), a state of charge (SoC), a state of function (SoF), etc. of each of a plurality of battery modules. Here, the SoH may indicate how much the performance of the battery 320 has deteriorated compared to when manufactured, the SoC may indicate information regarding the amount of electric charge accommodated by the battery 320, and the SoF may indicate information regarding how consistent the performance of the battery 320 is with a predetermined condition. Also, the BMS 310 may provide the SoH, the SoC, and the SoF to the electric power controller or the controller.

3. Hybrid Vertical Take-Off and Landing Aircraft with Variable Position of Thrust Generating Apparatus FIG. 4 is a block diagram showing a propulsion system of a serial-type hybrid vertical take-off and landing aircraft according to an embodiment.

Figure 4:
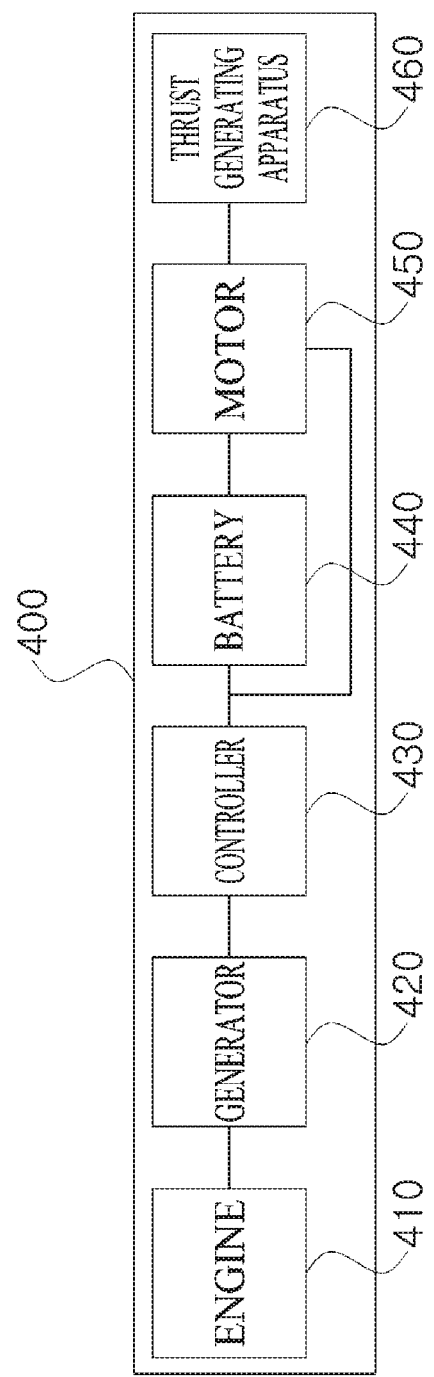
FIG. 4 is a block diagram showing a propulsion system of a serial-type hybrid vertical take-off and landing aircraft according to an embodiment.

Referring to FIG. 4, a propulsion system 400 of the hybrid vertical take-off and landing aircraft may include an engine 410, a generator 420, a controller 430, a battery 440, a motor 450, and a thrust generating apparatus 460. In an embodiment, the above descriptions of the hybrid vertical take-off and landing aircraft with reference to FIGS. 1 to 3 may be applied to the propulsion system 400 of the hybrid vertical take-off and landing aircraft of FIG. 4.

The engine 410 may burn fuel to generate mechanical power and may supply the generated power to the generator 420.

The generator 420 may produce electric power using the power supplied from the engine 410. In an embodiment, the generator 420 may be an integrated starter and generator (ISG). The ISG may produce AC electric power using the power supplied from the engine 410.

The battery 440 may store the electric power produced by the generator 420. In this case, the electric power stored in the battery 440 may be DC electric power. The battery 440 may supply electric power to the motor 450 according to the control of the controller 430.

The thrust generating apparatus 460 may generate thrust, and the hybrid vertical take-off and landing aircraft may fly using the generated thrust. In this case, the thrust generating apparatus 460 may be provided as at least one apparatus. As an example, the rotary wings 121, 122, and 123 of FIG. 1 may be included in the thrust generating apparatus 460.

The position of the thrust generating apparatus 460 may be variable. Here, the position does not refer to the absolute position of the thrust generating apparatus 460, but may be defined as a direction in which an axis of rotation (or a center (e.g., a core)) of the thrust generating apparatus 460 is directed. Thus, the current position of the thrust generating apparatus 460 may vary depending on the direction of the axis of rotation of the thrust generating apparatus 460.

The motor 450 may receive at least one of electric power stored in the battery 440 and electric power produced by the generator 420 but not stored in the battery 440 and may provide the power to the thrust generating apparatus 460. The motor 450 may receive required power indicating electric power supplied to the motor 450 according to the control of the controller 430. In an embodiment, the motor 450 may be a brushless DC electric motor (BLDC motor) or a permanent-magnet synchronous motor (PMSM).

The controller 430 may control the engine 410, the generator 420, the battery 440, the motor 450, and the thrust generating apparatus 460. In an embodiment, the controller 430 may convert AC electric power produced by the generator 420 into DC electric power. For example, the controller 430 may include a converter, which may convert AC electric power produced by the ISG into DC electric power.

Also, the controller 430 may control the position of the thrust generating apparatus 460 to be variable. The controller 430 may move the position of the thrust generating apparatus 460, that is, the direction of the axis of rotation of the thrust generating apparatus 460 between a first direction from the tail of the hybrid vertical take-off and landing aircraft to the head of the hybrid vertical take-off and landing aircraft and a second direction that is an upward direction perpendicular to the first direction. Here, the first direction may refer to the forward direction in which the hybrid vertical take-off and landing aircraft flies, and the second direction may refer to the upward direction that is perpendicular to the forward direction in which the hybrid vertical take-off and landing aircraft flies. The axis of rotation of the thrust generating apparatus 460 being in the first direction may be defined as a first position of the thrust generating apparatus 460, and the axis of rotation of the thrust generating apparatus 460 being in the second direction may be defined as a second position of the thrust generating apparatus 460.

When the hybrid vertical take-off and landing aircraft takes off or lands vertically, the controller 430 may move the position of the thrust generating apparatus 460 to the second position. When the position of the thrust generating apparatus 460 moves to the second position and the axis of rotation of the thrust generating apparatus 460 is in the second direction, the thrust generating apparatus 460 may generate thrust in a direction perpendicular to the hybrid vertical take-off and landing aircraft. The thrust generated in the vertical direction may facilitate the vertical take-off and landing of the hybrid vertical take-off and landing aircraft.

Also, when the hybrid vertical take-off and landing aircraft is in a level flight (e.g., a cruise flight or loitering flight), the controller 430 may move the position of the thrust generating apparatus 460 to the first position. When the position of the thrust generating apparatus 460 moves to the first position and the axis of rotation of the thrust generating apparatus 460 is in the first direction, the thrust generating apparatus 460 may generate thrust in a direction horizontal to the hybrid vertical take-off and landing aircraft. The thrust generated in the horizontal direction may facilitate the horizontal flight of the hybrid vertical take-off and landing aircraft.

Also, the position of the thrust generating apparatus 460 is not limited to the first position and the second position. Accordingly, the controller 430 may move the position of the thrust generating apparatus 460 to a point between the first position and the second position. In an embodiment, the controller 430 may change a direction of the axis of rotation of the thrust generating apparatus 460 from the second direction to the first direction according to altitude and flight speed when the hybrid vertical take-off and landing aircraft climbs and may change the direction of the axis of rotation of the thrust generating apparatus 460 from the first direction to the second direction according to altitude and flight speed when the hybrid vertical take-off and landing aircraft descends.

The controller 430 may confirm the current position of the thrust generating apparatus 460 and determine required power on the basis of the confirmed current position of the thrust generating apparatus 460.

Since the controller 430 can control the position of the thrust generating apparatus 460, the controller 430 may confirm the most recent control command that controlled the position of the thrust generating apparatus 460 to confirm the current position of the thrust generating apparatus 460. Also, the controller 430 may confirm information regarding the current position of the thrust generating apparatus 460 from the thrust generating apparatus 460.

With the same amount of electric power supplied to the motor 450, the flight distance of the hybrid vertical take-off and landing aircraft may vary depending on the current position of the thrust generating apparatus 460. For example, when the current position of the thrust generating apparatus 460 is the first position and also the hybrid vertical take-off and landing aircraft supplies a predetermined amount of electric power to the motor 450 to achieve horizontal flight, the hybrid vertical take-off and landing aircraft may have a large amount of movement, compared to vertical flight. Likewise, when the current position of the thrust generating apparatus 460 is the second position and also the hybrid vertical take-off and landing aircraft supplies a predetermined amount of electric power to the motor 450 to achieve horizontal flight, the hybrid vertical take-off and landing aircraft may have a small amount of movement, compared to vertical flight. This is because, when the current position of the thrust generating apparatus 460 is the first position, thrust may be generated by the thrust generating apparatus 460 in a horizontal direction and the thrust generated in the horizontal direction may act as resistance force during the vertical flight. Also, thrust generated in a vertical direction when the current position of the thrust generating apparatus 460 is the second position may act as resistance force during the horizontal flight. When the current position of the thrust generating apparatus 460 is the first position, in order to make the amount of movement upon the vertical flight equal to the amount of movement upon the horizontal flight, output power of the motor 450 upon the vertical flight should be greater than output power of the motor 450 upon the horizontal flight. That is, the output power of the motor 450 of the propulsion system 400 may vary depending on the current position of the thrust generating apparatus 460. Thus, the controller 430 may determine the output power of the motor 450 on the basis of the current position of the thrust generating apparatus 460. Also, since the output power of the motor corresponds to required power, the controller 430 may determine the required power on the basis of the current position of the thrust generating apparatus 460.

In an embodiment, threshold output power of the motor 450 may be determined on the basis of the current position of the thrust generating apparatus 460. For example, first threshold output power indicating threshold output power of the motor 450 upon the horizontal flight and second threshold output power indicating a threshold output power of the motor 450 upon the vertical flight may be predetermined. When a result of the confirmation of the current position of the thrust generating apparatus 460 is that the thrust generating apparatus 460 is in the first position, the controller 430 may control the output power of the motor to be equal to or less than the first threshold output power. On the other hand, when the thrust generating apparatus 460 is in the second position, the controller 430 may control the output power of the motor 450 to be equal to or less than the second threshold output power.

In an embodiment, the controller 430 may receive a piloting signal of the hybrid vertical take-off and landing aircraft through a communication interface, control the output power of the motor 450 by considering the current position of the thrust generating apparatus 460 according to the piloting signal, and determine required power on the basis of the controlled output power of the motor 450.

Here, the communication interface may refer to an interface through which the propulsion system 400 communicates with an external apparatus. As an example, the communication interface may be included in the controller 430. Also, the piloting signal may include a piloting instruction that controls acceleration, deceleration, or altitude variation of the hybrid vertical take-off and landing aircraft and may include a piloting instruction that controls target altitude, target speed, or target acceleration of the hybrid vertical take-off and landing aircraft. As an example, the propulsion system 400 may receive the piloting signal from a ground station.

In an embodiment, the amount of electric power required by the motor 450 may be determined on the basis of the current position of the thrust generating apparatus 460. For example, when the current position of the thrust generating apparatus 460 is the first position, the amount of electric power required by the motor 450 when the hybrid vertical take-off and landing aircraft is flying horizontally may be less than the amount of electric power required by the motor 450 when the hybrid vertical take-off and landing aircraft is flying vertically. This is because, when the current position of the thrust generating apparatus 460 is the first position and also the hybrid vertical take-off and landing aircraft is flying vertically, the thrust generated in the horizontal direction acts as resistance force, thus increasing load on the motor 450. Also, when the current position of the thrust generating apparatus 460 is the second position, the amount of electric power required by the motor 450 when the hybrid vertical take-off and landing aircraft is flying horizontally may be greater than the amount of electric power required by the motor 450 when the hybrid vertical take-off and landing aircraft is flying vertically. Thus, the controller 430 may control the output power of the motor 450 according to the piloting signal on the basis of the amount of electric power required by the motor 450 that varies depending on the current position of the thrust generating apparatus 460.

Also, the controller 430 may control the output power of the motor 450 to reach at least one of target altitude, target speed, and target acceleration of the hybrid vertical take-off and landing aircraft included in the piloting signal, by considering the current position of the thrust generating apparatus. For example, on condition that the target speed included in the piloting signal is 80 km/h, the controller 430 may set the output power of the motor 450 as 1.5 kW when the current position of the thrust generating apparatus 460 is the first position and may set the output power of the motor 450 as 4 kW when the current position of the thrust generating apparatus 460 is the second position.

Also, the controller 430 may determine the amount of electric power stored in battery 440 and the amount of electric power not stored in the battery 440 from the power supplied to the motor 450, on the basis of the determined required power. According to the determined amount of electric power, the controller 430 may perform a control to supply only the electric power stored in the battery 440 to the motor 450, supply only the electric power not stored in the battery 440 to the motor 450, or supply both the electric power stored in the battery 440 and the electric power not stored in the battery 440 to the motor 450.

In an embodiment, the controller 430 may supply the power not stored in the battery 440 to the motor 450 preferentially over the power stored in the battery 440. This is to enhance fuel efficiency of the hybrid vertical take-off and landing aircraft. For example, when the amount of required power is greater than the amount of electric power not stored in the battery 440, the controller 430 may perform a control to supply all of the power not stored in the battery 440 and supply, to the motor 450, electric power corresponding to a difference between the amount of electric power not stored in the battery 440 and the amount of required power out of the electric power stored in the battery 440. An another example, when the amount of required power is equal to the amount of electric power not stored in the battery 440, the controller 430 may supply only the amount of electric power not stored in the battery 440 to the motor 450. As still another example, when the amount of required power is less than the amount of electric power not stored in the battery 440, the controller 430 may perform a control to supply only the power not stored in the battery 440 to the motor 450 and store, in the battery 440, the remaining electric power of the power not stored in the battery 440 other than the power supplied to the motor 450.

In another embodiment, the controller 430 may supply the power stored in the battery 440 to the motor 450 preferentially over the power not stored in the battery 440. For example, when the hybrid vertical take-off and landing aircraft lands, the controller 430 may supply the electric power stored in the battery 440 to the motor 450 preferentially over the power not stored in the battery 440. This is to consume the power stored in the battery 440 before the hybrid take-off and landing aircraft lands in order to enhance fuel efficiency. For example, when the amount of required power is greater than the amount of electric power stored in the battery 440, the controller 430 may perform a control to supply all of the power stored in the battery 440 and supply, to the motor 450, electric power corresponding to a difference between the amount of electric power stored in the battery 440 and the amount of required power out of the electric power not stored in the battery 440. As another example, when the amount of required power is equal to or less than the amount of electric power stored in the battery 440, the controller 430 may perform a control to supply only the electric power stored in the battery 440 to the motor 450.

In an example of FIG. 4, the controller 430 may be represented as one unit. However, the controller 430 may be composed of a first controller and a second controller. Also, embodiments of the present invention are not limited thereto. The controller 430 may be composed of a plurality of units. As an example, the first controller may correspond to the controller 250 of FIG. 2, and the second controller may correspond to the electric power controller 240 of FIG. 2.

The first controller may control an operation of the second controller, the movement of the hybrid vertical take-off and landing aircraft, and the communication between the hybrid vertical take-off and landing aircraft and a ground station. Also, the first controller may confirm the current position of the thrust generating apparatus 460 and determine required power on the basis of the confirmed current position of the thrust generating apparatus 460.

The controller 2 may determine the amount of electric power stored in battery 440 and the amount of electric power not stored in the battery 440 from the power supplied to the motor 450, on the basis of the determined required power. Also, the second controller may adjust the amount of electric power produced by the generator 420 and the amount of electric power stored in the battery 440 on the basis of the required power.

Also, the second controller may include a converter, which may convert AC electric power produced by an ISG into DC electric power and store the DC electric power in the battery 440 or directly supply the DC electric power to the motor 450. Also, the second controller may supply the DC electric power to an auxiliary battery. The first controller may be driven by receiving the DC electric power from the auxiliary battery.

Also, the second controller may control the ISG to adjust the amount of production of the AC electric power. For example, when the amount of required power is less than the amount of electric power that is produced by the ISG but not stored in the battery, the second controller may control the ISG to produce electric power by the amount of required power.

Figure 5:
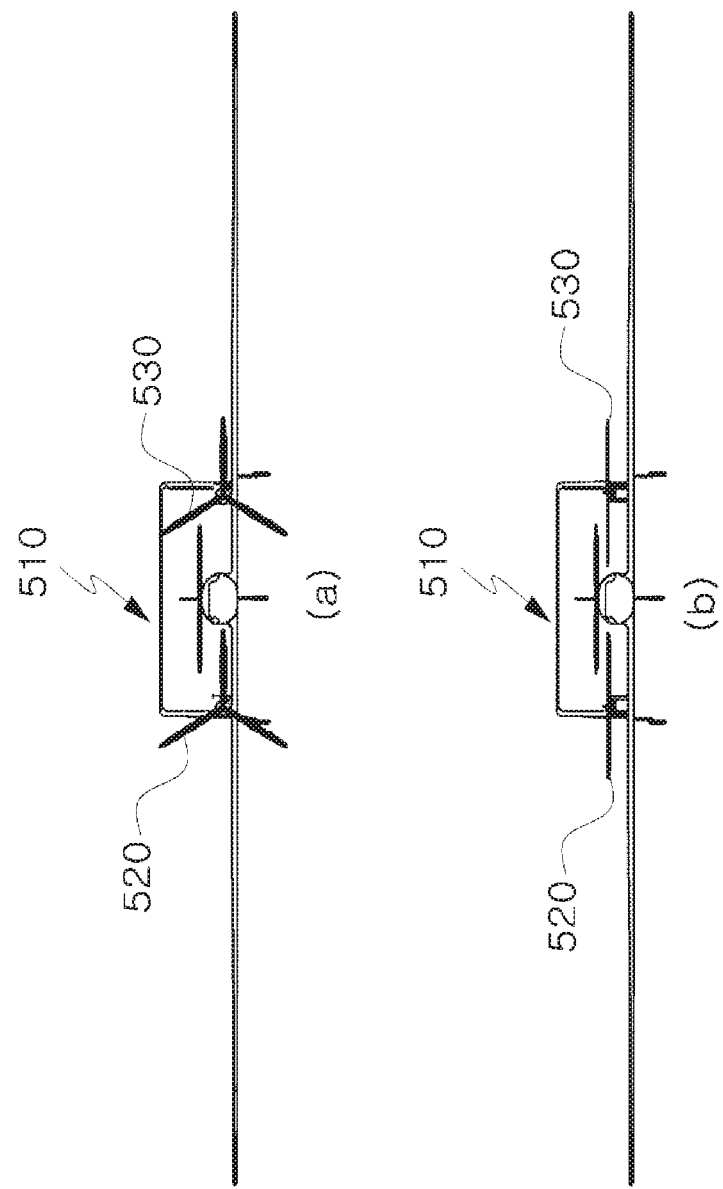
FIG. 5 is a diagram for describing a change in position of a propulsion generating device according to an embodiment.

FIG. 5 is a diagram for describing a change in position of a propulsion generating device according to an embodiment.

Referring to FIG. 5, thrust generating apparatuses 520 and 530 of the hybrid vertical take-off and landing aircraft 510 may vary in position. When the hybrid vertical take-off and landing aircraft 510 is in a horizontal flight such as a cruising flight or a loitering flight, as shown in (a), the hybrid vertical take-off and landing aircraft 510 may tilt the axes of rotation of the thrust generating apparatuses 520 and 530 in the forward direction. Also, when the hybrid vertical take-off and landing aircraft 510 is in a vertical flight such as vertical take-off or vertical landing, as shown in (b), the hybrid vertical take-off and landing aircraft 510 may tilt the axes of rotation of the thrust generating apparatuses 520 and 530 in the upward direction. This is to generate thrust in a direction in which the hybrid vertical take-off and landing aircraft 510 intends to fly by tilting the thrust generating apparatuses 520 and 530. Also, the hybrid vertical take-off and landing aircraft 510 may confirm the current positions of the thrust generating apparatuses 520 and 530, determine required power indicating power supplied to the motor on the basis of the current positions of the thrust generating apparatuses 520 and 530, and determine the amount of electric power stored in the battery and the amount of electric power not stored in the battery from the power supplied to the motor on the basis of the determined required power.

Figure 6:
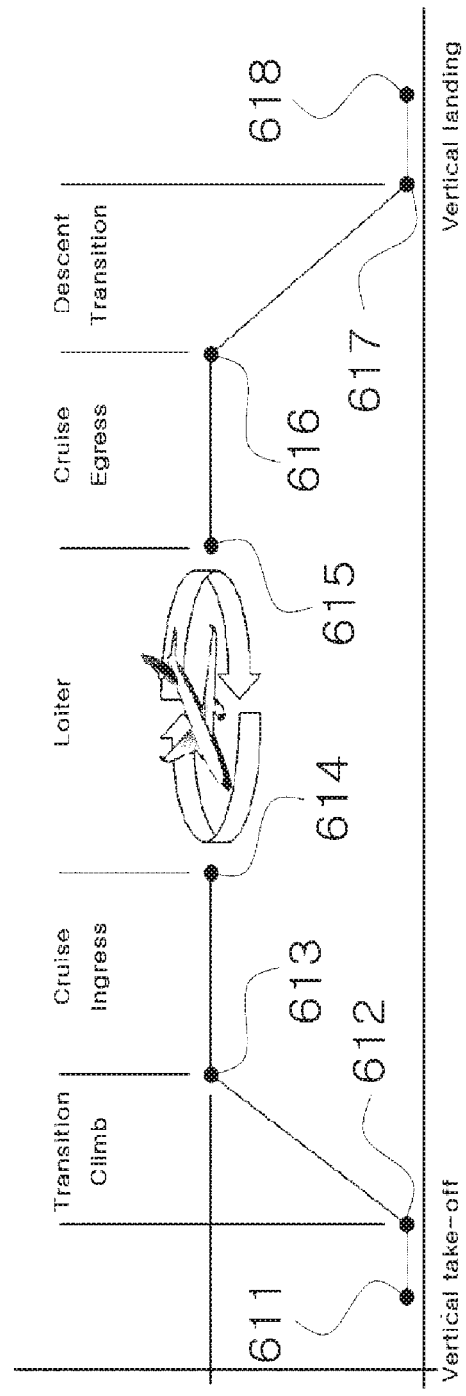
FIG. 6 is a diagram showing a mission profile of a hybrid vertical take-off and landing aircraft during a mission according to an embodiment.

FIG. 6 is a diagram showing a mission profile of a hybrid vertical take-off and landing aircraft during a mission according to an embodiment.

Referring to FIG. 6, a horizontal axis of a graph of FIG. 6 may represent range, and a vertical axis may represent altitude. It is assumed that the hybrid vertical take-off and landing aircraft in FIG. 6 is the same as the hybrid vertical take-off and landing aircraft 510 shown in FIG. 5. In time points 611 to 618, the hybrid vertical take-off and landing aircraft may control the thrust generating apparatus to make a flight. In this case, the hybrid vertical take-off and landing aircraft may determine required power on the basis of the current position of the thrust generating apparatus and may determine the amount of electric power stored in the battery and the amount of electric power produced by the generator but not stored in the battery on the basis of the determined required power.

From time point 611 to time point 612, the hybrid vertical take-off and landing aircraft may take off vertically. In this case, the axis of rotation of the thrust generating apparatus may be directed in the upward direction. For example, the hybrid vertical take-off and landing aircraft may determine the amount of electric power stored in the battery as 2 kW and the amount of electric power not stored in the battery as 2 kW from the required power.

Also, the hybrid vertical take-off and landing aircraft may make a climbing flight from time point 612 to time point 613. In this case, the axis of rotation of the thrust generating apparatus may be changed from the upward direction to the forward direction or may be fixed to the upward direction or forward direction. As an example, the hybrid vertical take-off and landing aircraft may make a climbing flight for 10 minutes and may determine the amount of electric power stored in the battery as 1 kW and the amount of electric power not stored in the battery as 2 kW from the required power. Also, the hybrid vertical take-off and landing aircraft may make a cruising flight from time point 613 to time point 614 or from time point 615 to time point 616. In this case, the axis of rotation of the thrust generating apparatus may be directed in the forward direction. For example, the hybrid vertical take-off and landing aircraft may fly at the speed of 80 km/h and may determine the electric power stored in the battery as 1 kW and the amount of electric power not stored in the battery as 1 kW from the required power. Also, the hybrid vertical take-off and landing aircraft may enter dash mode that rapidly increases the speed from time point 615 to time point 616. For example, in the dash mode, the hybrid vertical take-off and landing aircraft may fly at the speed of 120 km/h and may determine the electric power stored in the battery as 1 kW and the amount of electric power not stored in the battery as 2 kW from the required power. Also, the hybrid vertical take-off and landing aircraft may supply only the electric power not stored in the battery to the motor to make a cruising flight.

Also, the hybrid vertical take-off and landing aircraft may make a loitering flight from time point 614 to time point 615. In this case, the axis of rotation of the thrust generating apparatus may be directed in the forward direction. For example, the hybrid vertical take-off and landing aircraft may make a loitering flight using only the electric power not stored in the battery and may deliver electric power produced by the generator but not stored in the battery to the motor while charging the battery with electric power produced by the generator. Also, the hybrid vertical take-off and landing aircraft may enter the silence mode that supplies only the electric power stored in the battery to the motor. In this case, the hybrid vertical take-off and landing aircraft may turn off its engine to prevent the generator from producing electric power.

Also, the hybrid vertical take-off and landing aircraft may make a descent flight from time point 616 to time point 617. In this case, the axis of rotation of the thrust generating apparatus may be changed from the forward direction to the upward direction or may be fixed to the upward direction or forward direction. As an example, the hybrid vertical take-off and landing aircraft may make the descent flight using only the electric power not stored in the battery and may deliver electric power produced by the generator but not stored in the battery to the motor while charging the battery with electric power produced by the generator.

Also, the hybrid vertical take-off and landing aircraft may land vertically from time point 617 to time point 618. In this case, the axis of rotation of the thrust generating apparatus may be directed in the upward direction. For example, the hybrid vertical take-off and landing aircraft may preferentially supply the electric power stored in the battery to the motor in order to enhance fuel consumption efficiency.

Figure 7:
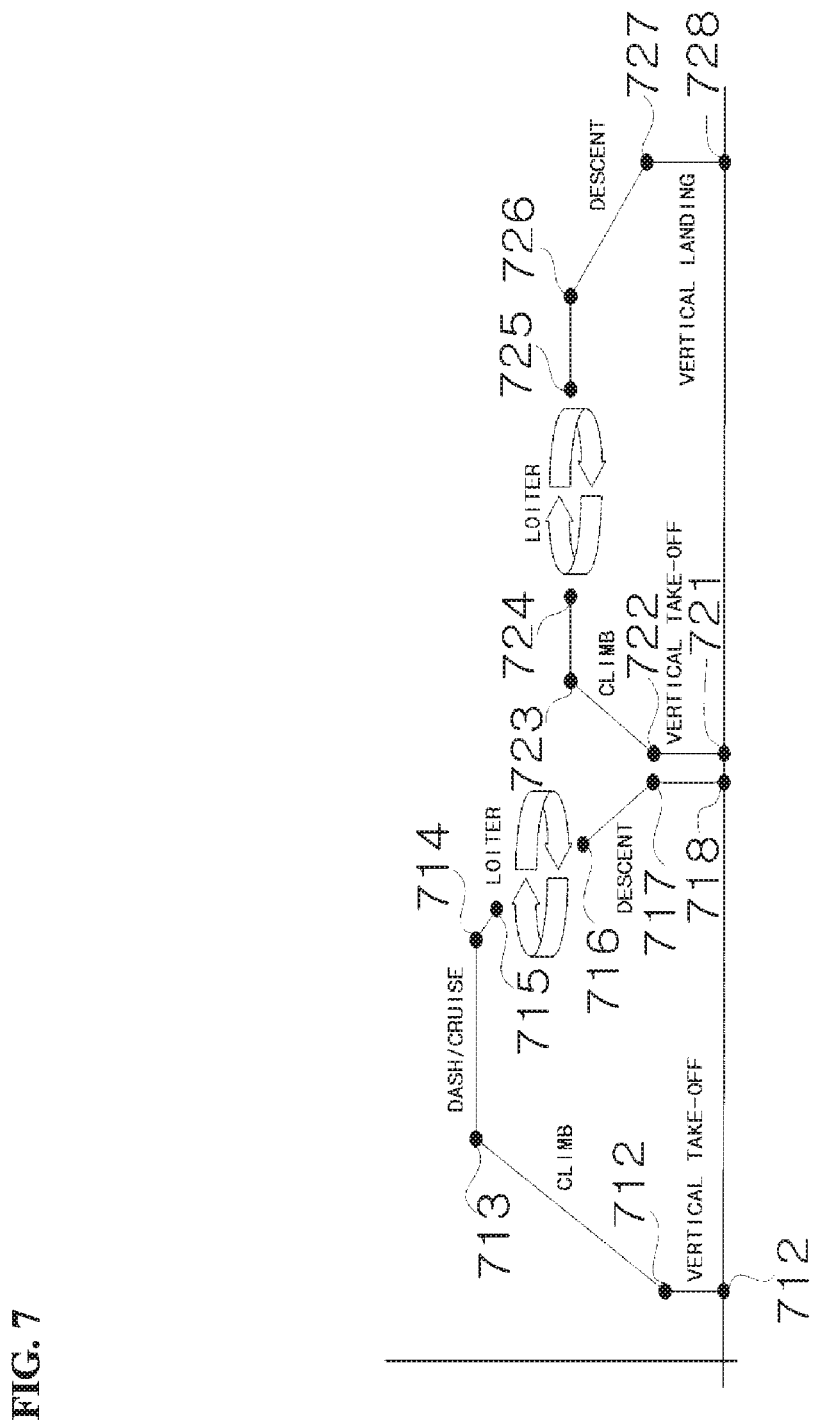
FIG. 7 is a diagram showing a mission profile of a hybrid vertical take-off and landing aircraft during a mission according to another embodiment.

FIG. 7 is a diagram showing a mission profile of a hybrid vertical take-off and landing aircraft during a mission according to another embodiment.

Referring to FIG. 7, a horizontal axis of a graph of FIG. 7 may represent range, and a vertical axis may represent altitude. It is assumed that the hybrid vertical take-off and landing aircraft in FIG. 7 is the same as the hybrid vertical take-off and landing aircraft 510 shown in FIG. 5. In time points 711 to 728, the hybrid vertical take-off and landing aircraft may control the thrust generating apparatus to make a flight. In this case, the hybrid vertical take-off and landing aircraft may determine required power on the basis of the current position of the thrust generating apparatus and may determine the amount of electric power stored in the battery and the amount of electric power produced by the generator but not stored in the battery on the basis of the determined required power.

From time point 711 to time point 712, the hybrid vertical take-off and landing aircraft may take off vertically. In this case, the axis of rotation of the thrust generating apparatus may be directed in the upward direction. Also, the hybrid vertical take-off and landing aircraft may make a climbing flight from time point 712 to time point 713. In this case, the axis of rotation of the thrust generating apparatus may be changed from the upward direction to the forward direction or may be fixed to the upward direction or forward direction. Also, the hybrid vertical take-off and landing aircraft may make a cruising flight from time point 713 to time point 714. In this case, the axis of rotation of the thrust generating apparatus may be directed in the forward direction. Also, the hybrid vertical take-off and landing aircraft may enter the dash mode that rapidly increases the speed from time point 713 to time point 714. Also, the hybrid vertical take-off and landing aircraft may supply only the electric power not stored in the battery to the motor to make a cruising flight. Also, the hybrid vertical take-off and landing aircraft may make a descent flight from time point 714 to time point 717. In this case, the axis of rotation of the thrust generating apparatus may be changed from the forward direction to the upward direction or may be fixed to the upward direction or forward direction. As an example, the hybrid vertical take-off and landing aircraft may make the descent flight using only the electric power not stored in the battery and may deliver electric power produced by the generator but not stored in the battery to the motor while charging the battery with electric power produced by the generator. Also, while making the descent flight, from time point 715 to time point 716, the hybrid vertical take-off and landing aircraft may make a loitering flight. For example, the hybrid vertical take-off and landing aircraft may make a loitering flight using only the electric power not stored in the battery and may deliver electric power produced by the generator but not stored in the battery to the motor while charging the battery with electric power produced by the generator. Also, the hybrid vertical take-off and landing aircraft may enter the silence mode that supplies only the electric power stored in the battery to the motor. In this case, the hybrid vertical take-off and landing aircraft may turn off its engine to prevent the generator from producing electric power. Also, the hybrid vertical take-off and landing aircraft may land vertically from time point 717 to time point 718. In this case, the axis of rotation of the thrust generating apparatus may be directed in the upward direction.

Also, the hybrid vertical take-off and landing aircraft may take off vertically again from time point 721 to time point 722. The hybrid vertical take-off and landing aircraft may make a climbing flight from time point 722 to time point 723, make a cruising flight from time point 723 to time point 724, make a loitering flight from time point 724 to time point 725, and make a cruising flight again from time point 725 to time point 726. As an example, when the hybrid vertical take-off and landing aircraft makes a loitering flight or cruising flight, the hybrid vertical take-off and landing aircraft may enter the silence mode that supplies only the electric power stored in the battery to the motor. Also, the hybrid vertical take-off and landing aircraft may make a descent flight from time point 726 to time point 727 and may land vertically from time point 727 to time point 728.

Figure 8:
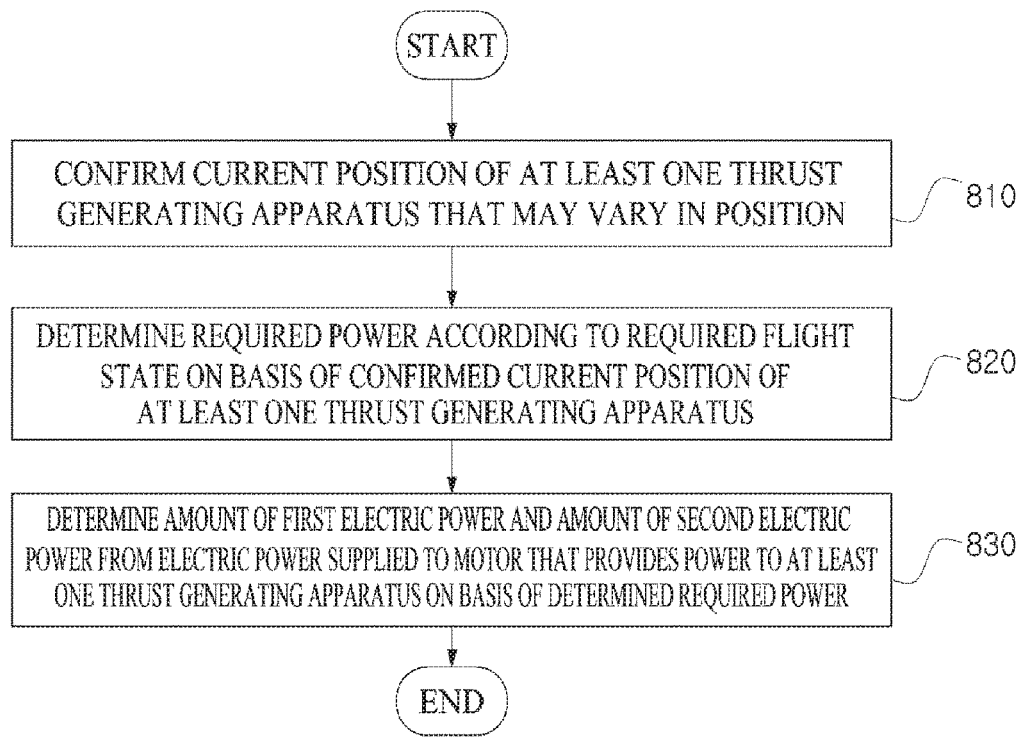
FIG. 8 is an operational flowchart for describing an electric power control method of a hybrid vertical take-off and landing aircraft according to an embodiment.

FIG. 8 is an operational flowchart for describing an electric power control method of a hybrid vertical take-off and landing aircraft according to an embodiment.

Referring to FIG. 8, the hybrid vertical take-off and landing aircraft may confirm the current position of at least one thrust generating apparatus whose position is variable (810).

Also, the hybrid vertical take-off and landing aircraft may determine required power according to a required flight state on the basis of the confirmed current position of the at least one thrust generating apparatus (820).

Also, the hybrid vertical take-off and landing aircraft may determine the amount of first electric power and the amount of second electric power from the electric power supplied to the motor that provides power to the at least one thrust generating apparatus on the basis of the determined required power (830). Here, the first electric power may refer to electric power stored in the battery from electric power produced by the generator using the power supplied by the engine, and the second electric power may refer to electric power not stored in the battery from the electric power produced by the generator.

The above descriptions with reference to FIGS. 1 to 7 may be applied to the method of controlling electric power of the hybrid vertical take-off and landing aircraft shown in FIG. 8, and thus a detailed description thereof will be omitted.

4. Operation Mode of Hybrid Vertical Take-Off and Landing Aircraft

Figure 9:
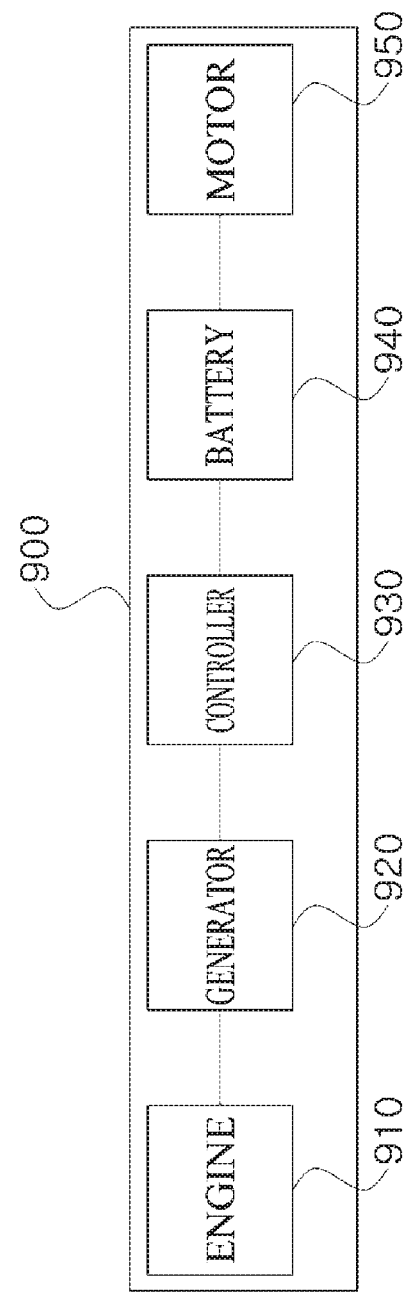
FIG. 9 is a block diagram showing a propulsion system of a serial-type hybrid vertical take-off and landing aircraft according to another embodiment.

FIG. 9 is a block diagram showing a propulsion system of a serial-type hybrid vertical take-off and landing aircraft according to another embodiment.

Referring to FIG. 9, a propulsion system 900 of the hybrid vertical take-off and landing aircraft may include an engine 910, a generator 920, a controller 930, a battery 940, and a motor 950. In an embodiment, the descriptions of the hybrid vertical take-off and landing aircraft with reference to FIGS. 1 to 3 may be applied to the propulsion system 900 of FIG. 9.

The engine 910 may burn fuel to generate mechanical power and may supply the generated power to the generator 920.

The generator 920 may produce electric power using the power supplied from the engine 910. In an embodiment, the generator 920 may be an integrated starter and generator (ISG). The ISG may produce AC electric power using the power supplied from the engine 410.

The battery 940 may store the electric power produced by the generator 920. In this case, the electric power stored in the battery 940 may be DC electric power. The battery 940 may supply electric power to the motor 950 according to the control of the controller 930.

The motor 950 may receive at least one of electric power stored in the battery 940 and electric power produced by the generator 920 but not stored in the battery 440 and may provide the power to at least one thrust generating apparatus. The motor 950 may receive required power indicating electric power supplied to the motor 950 according to the control of the controller 930. In an embodiment, the motor 450 may be a brushless DC electric motor (BLDC motor) or a permanent-magnet synchronous motor (PMSM).

The controller 930 may control the engine 910, the generator 920, the battery 940, and the motor 950. In an embodiment, the controller 930 may convert AC electric power produced by the generator 920 into DC electric power. For example, the controller 930 may include a converter (e.g., 3-phase inverter), which may convert AC electric power produced by the ISG into DC electric power.

The controller 930 may select an operation mode of the propulsion system 900. Here, the operation mode may include silence mode and normal mode. The silence mode may refer to an operation mode that supplies electric power stored in the battery to the motor and does not supply electric power produced by the generator but not stored in the battery to the motor. Since the generator need not generate electric power in the silence mode, the controller 930 may control the generator 920 to stop producing the electric power and may control the engine 910 to be turned off. Thus, noise generated by the hybrid vertical take-off and landing aircraft may be decreased.

The normal mode may refer to an operation mode that supplies the electric power not stored in the battery 940 to the motor 950. Thus, in the normal mode, the controller 930 may perform a control to supply only the electric power not stored in the battery to the motor 950 or to supply the electric power stored in the battery 940 and also the electric power not stored in the battery 940 to the motor 950. Also, the normal mode may include dash mode. The dash mode may refer to an operation mode that rapidly accelerates the hybrid vertical take-off and landing aircraft. Thus, the required power of the motor may increase in the dash mode.

In an embodiment, the controller 930 may receive a piloting signal using a communication interface. Here, the piloting signal may include a piloting instruction that controls the operation mode. The controller 930 may extract the piloting instruction from the piloting signal and may select the silence mode or the normal mode according to the piloting instruction.

Also, the piloting signal may include information regarding coordinates or time at which the hybrid vertical take-off and landing aircraft enters the silence mode. In this case, the controller 930 may select the silence mode in response to the reaching of the silence mode entry coordinates or time included in the piloting signal. For example, for the case in which that the piloting signal includes a control instruction to enter the silence mode from point A to point B, the controller 930 may select the silence mode as the operation mode when the hybrid vertical take-off and landing aircraft reaches point A and may select the normal mode as the operation mode when the hybrid vertical take-off and landing aircraft reaches point B.

Also, before reaching the silence mode entry coordinates or time included in the piloting signal, the controller 930 may store electric power to be used in the silence mode in the battery 940. To this end, the controller 930 may adjust the amount of electric power produced by the generator 920 in the normal mode to store the electric power produced by the generator 920 in the battery so that the silence mode is entered when the silence mode entry coordinates or time included in the piloting signal is reached. In the above example, the controller 930 may estimate an expected time taken to reach point A and may determine whether the hybrid vertical take-off and landing aircraft can make a flight in the silence mode during a predetermined duration when the electric power produced by the generator 920 is stored in the battery up to the expected time by using the current amount of electric current produced by the generator 920. When it is determined that the flight is impossible, the controller 930 may increase the amount of electric power produced by the generator 920, store the produced electric power in the battery 940, and thereby secure the amount of electric power sufficient to make a flight in the silence mode for the predetermined duration.

Also, the piloting signal may include information regarding the duration of the silence mode. For example, the piloting signal may include a control instruction to maintain the silence mode for 5 minutes. In this case, in the normal mode, the controller 930 may determine whether the silence mode can be maintained for the duration. When it is determined that the silence mode cannot be maintained for the duration, the controller 930 may adjust the amount of production of the generator 920 before reaching the silence mode entry coordinates or time included in the piloting signal. Thus, the controller 930 may store the produced electric city in the battery 940 in order to maintain the silence mode for the duration.

Also, the piloting signal may include information regarding coordinates or time at which the hybrid vertical take-off and landing aircraft take-off and landing aircraft exits the silence mode. In this case, the controller 930 may select the normal mode in response to the reaching of the silence mode exit coordinates or time included in the piloting signal. For example, when the piloting signal includes a control instruction to exit the silence mode after 10 minutes, the controller may select the normal mode as the operation mode 10 minutes after receiving the piloting signal. Also, the piloting signal may include a piloting instruction that controls acceleration, deceleration, or altitude variation of the hybrid vertical take-off and landing aircraft and may include a piloting instruction that controls target altitude, target speed, or target acceleration of the hybrid vertical take-off and landing aircraft. The controller 930 may control output power of the motor 950 according to the piloting signal and may determine required power of the motor 950 on the basis of the output power of the motor 950.

In an embodiment, when the amount of required power is greater than the amount of electric power stored in the battery in the silence mode, the controller 930 may control the output power of the motor 950 to decrease the amount of required power to the amount of electric power stored in the battery 940 or less. For example, for the case in which that electric power corresponding to 80 km/h is 4 kW and electric power corresponding to 60 km/h is 3 kW, when the amount of required power is 4 kW and the electric power stored in the battery is 3 kW, the controller 930 may adjust the speed of the hybrid vertical take-off and landing aircraft by decreasing the amount of required power to 3 kW. In the silence mode, only the electric power stored in the battery 940 is supplied to the motor 950. Thus, the output power of the motor 950 may correspond to the electric power stored in the battery 940. Accordingly, when the amount of required power is greater than the electric power stored in the battery 940, the motor 950 cannot receive electric power equal to the required power from the battery 940. Accordingly, the controller 930 may control the amount of required power to supply only the electric power stored in the battery 940 to the motor 950.

Also, in the silence mode, the controller 930 may supply only the electric power stored in the battery 940 to the motor 950 when the amount of required power is equal to or less than the amount of electric power stored in the battery 940.

In an embodiment, the controller 930 may control the output power of the motor 950 to control the duration of the silence mode. Since the silence mode uses only the electric power stored in the battery 940, the duration over which the silence mode can be maintained may be limited. Also, the duration may decrease when the required power is large, and may increase when the required power is small because consumption of the electric power stored in the battery decreases. Thus, the controller 930 may compare the required power and the power stored in the battery 940 to estimate the duration of the silence mode.

Also, the controller 930 may transmit information associated with the silence mode to a piloting apparatus configured to pilot the hybrid vertical take-off and landing aircraft through a communication interface. For example, the controller 930 may transmit a notification message including information regarding the amount of electric power stored in the battery 940, the duration of the silence mode, the amount of required power, the amount of change in duration according to a change in the required power, etc. to the piloting apparatus configured to pilot the hybrid vertical take-off and landing aircraft. In an embodiment, when the estimated duration is equal to or less than a predetermined time, the controller 930 may transmit the notification message through the communication interface. For example, the controller 930 may generate the notification message including information regarding the amount of electric power stored in the battery 940, the duration of the silence mode, etc. and may transmit the generated notification message to the piloting apparatus configured to pilot the hybrid vertical take-off and landing aircraft.

Also, when the estimated duration is equal to or less than a predetermined time, the controller 930 may decrease the amount of required power may decrease the current amount of required power or less. As the current amount of required power decreases, the amount of electric power supplied to the motor 950 of the battery 940 may decrease, and thus the duration of the silence mode may increase.

Also, the piloting signal may include information regarding at least one of a target speed and target acceleration of the hybrid vertical take-off and landing aircraft. In this case, the controller 930 may control the output power of the motor 950 to reach the target speed or the target acceleration and may determine required power indicating electric power supplied to the motor 950 on the basis of the controlled output power of the motor 950. For example, when the hybrid vertical take-off and landing aircraft is flying at a speed of 60 km/h, the piloting signal received by the controller 930 may include a piloting instruction to fly at the target speed of 120 km/h. In this case, since the hybrid vertical take-off and landing aircraft is rapidly accelerated, the controller 930 may select the dash mode included in the normal mode as the operation mode. As the hybrid vertical take-off and landing aircraft enters the dash mode, the controller 930 may increase the output power of the motor 950 to allow the hybrid vertical take-off and landing aircraft to reach the speed of 120 km/h and may determine required power corresponding to the increased output power of the motor 950. Also, in order to supply electric power corresponding to the required power to the motor 950, the controller 930 may supply the electric power stored in battery 940 and also the electric power produced by the generator 920 but not stored in the battery 940 to the motor 950.

In an example of FIG. 9, the controller 930 may be represented as one unit. However, the controller 930 may be composed of a first controller and a second controller. Also, embodiments of the present invention are not limited thereto. The controller 930 may be composed of a plurality of units. As an example, the first controller may correspond to the controller 250 of FIG. 2, and the second controller may correspond to the electric power controller 240 of FIG. 2.

The first controller may select the silence mode or the normal mode as the operation mode of the propulsion system 900.

The second controller may determine the amount of electric power stored in battery 940 and the amount of electric power not stored in the battery 940 from the power supplied to the motor 950, on the basis of the selected mode.

Figure 10:
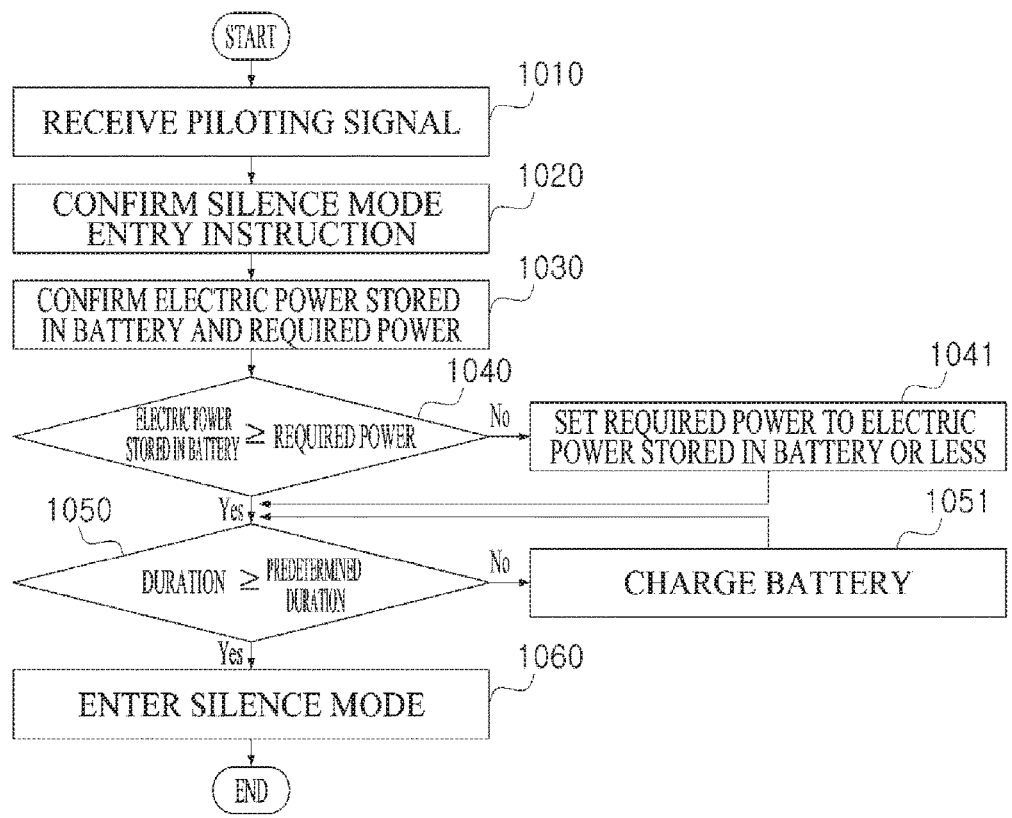
FIG. 10 is an operational flowchart for describing entry into silence mode according to an embodiment.

FIG. 10 is an operational flowchart for describing entry into silence mode according to an embodiment.

Referring to FIG. 10, the hybrid vertical take-off and landing aircraft may receive a piloting signal through a communication interface (1010).

Also, the hybrid vertical take-off and landing aircraft may confirm a silence mode entry instruction included in the piloting signal (1020).

Also, the hybrid vertical take-off and landing aircraft may confirm the amount of electric power stored in the battery and the amount of required power (1030).

Also, the hybrid vertical take-off and landing aircraft may determine whether the amount of electric power stored in the battery is equal to or greater than the amount of required power (1040). When it is determined that the amount of electric power stored in the battery is smaller than the amount of required power, the hybrid vertical take-off and landing aircraft may set the amount of required power to be the amount of electric power stored in the battery or less (1041).

Also, when it is determined that the amount of electric power stored in the battery is equal to or greater than the amount of required power, the hybrid vertical take-off and landing aircraft may determine whether the duration of the silence mode is equal to or greater than a predetermined duration (1050). Here, the predetermined duration may include a predetermined default duration or a duration included in the piloting signal. When it is determined the duration of the silence mode is less than the predetermined duration, the hybrid vertical take-off and landing aircraft may charge the battery to increase the duration of the silence mode to the predetermined duration in the normal mode or greater (1051). In this case, the hybrid vertical take-off and landing aircraft may control the amount of electric power produced by the generator according to the amount of electric power needed to charge the battery. After charging the battery, the hybrid vertical take-off and landing aircraft may determine whether the duration of the silence mode is equal to or greater than the predetermined duration again.

Also, when it is determined that the duration of the silence mode is equal to or greater than the predetermined duration, the hybrid vertical take-off and landing aircraft may enter the silence mode (1060).

Figure 11:
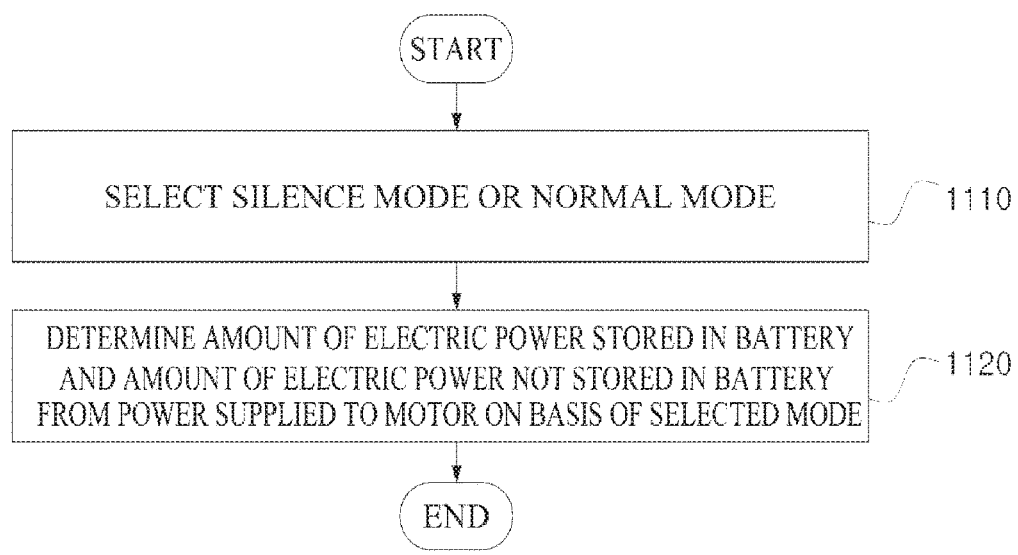
FIG. 11 is an operational flowchart for describing a method of controlling a hybrid vertical take-off and landing aircraft according to another embodiment.

FIG. 11 is an operational flowchart for describing a method of controlling a hybrid vertical take-off and landing aircraft according to another embodiment.

Referring to FIG. 11, the hybrid vertical take-off and landing aircraft may select, as an operation mode, the silence mode that supplies only the electric power stored in the battery to the motor, adjusts the output power of the motor, and controls the duration or the normal mode that supplies the electric power produced by the generator but not stored in the battery to the motor. Here, the battery may store electric power produced by the generator using the power supplied by the engine, and the motor may receive at least one of the electric power stored in the battery and the electric power produced by the generator but not stored in the battery and may provide the power to at least one thrust generating apparatus (1110).

Also, the hybrid vertical take-off and landing aircraft may determine the amount of electric power stored in the battery and the amount of electric power not stored in the battery from the power supplied to the motor on the basis of the selected mode (1120).

The above descriptions with reference to FIGS. 1 to 10 may be applied to the method of controlling the hybrid vertical take-off and landing aircraft shown in FIG. 11, and thus a detailed description thereof will be omitted.

5. Mixed Type Hybrid Vertical Take-Off and Landing Aircraft

Figure 12:
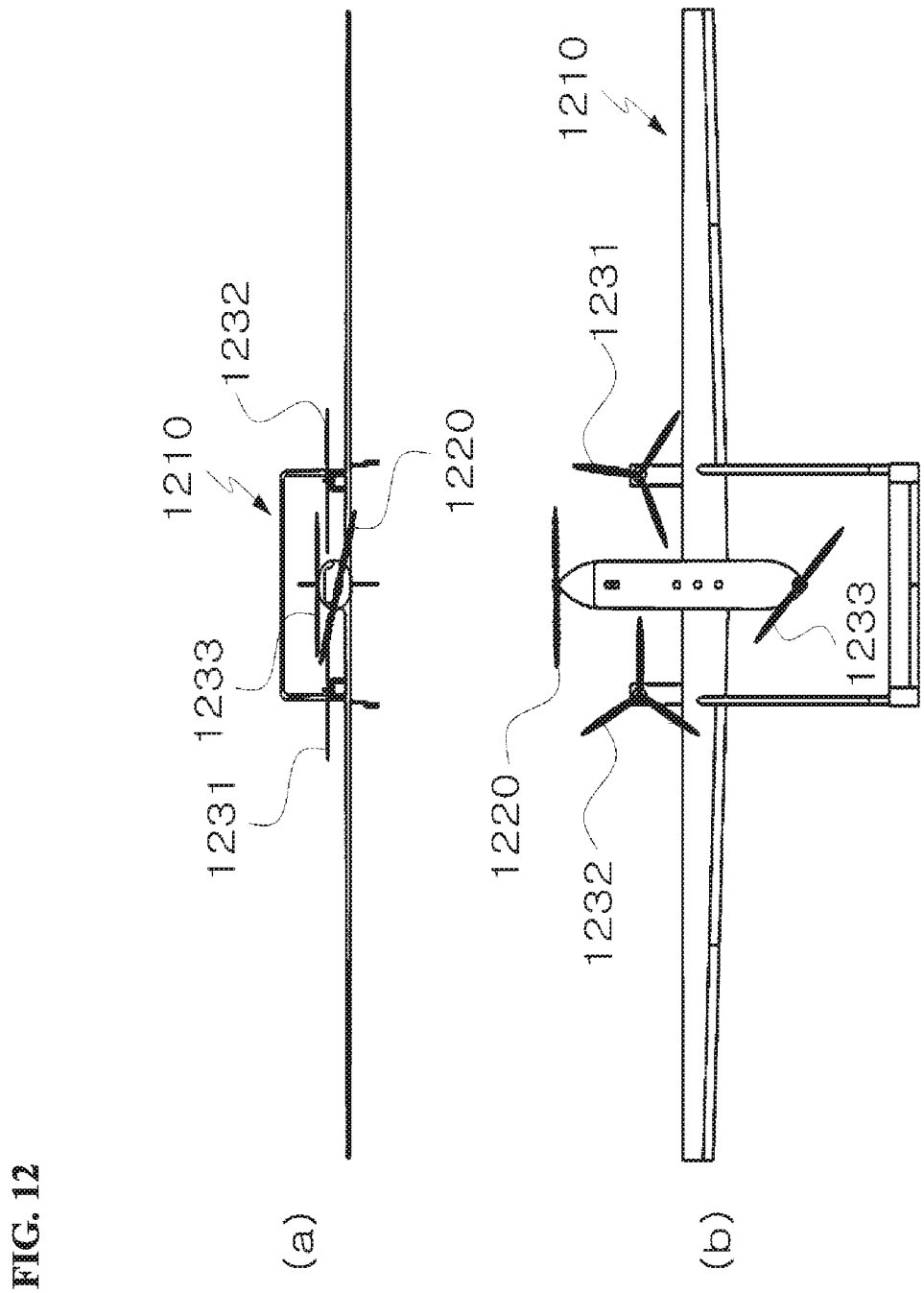
FIG. 12 is a diagram for describing a mixed type hybrid vertical take-off and landing aircraft according to an embodiment.

FIG. 12 is a diagram for describing a mixed type hybrid vertical take-off and landing aircraft according to an embodiment.

Referring to FIG. 12, as shown in (a) and (b), a hybrid vertical take-off and landing aircraft 1210 may include a first rotary wing 1220 and second rotary wings 1231, 1232, and 1233. The hybrid vertical take-off and landing aircraft 1210 may supply power to the first rotary wing 1220 and the second rotary wings 1231, 1232, and 1233 in a mixed type hybrid method. In an embodiment, the first rotary wing 1220 may be connected with an engine to directly receive power from the engine, and the second rotary wings 1231, 1232, and 1233 may receive electric power produced by the generator. Here, the generator may receive power from the engine and produce electric power. The first rotary wing 1220 may directly receive power from the engine, and the second rotary wings 1231, 1232, and 1233 may receive electric power converted from the power generated from the engine, thus decreasing energy conversion loss of the generator, increasing fuel efficiency, and increasing thrust of the hybrid vertical take-off and landing aircraft 1210.

Figure 13:
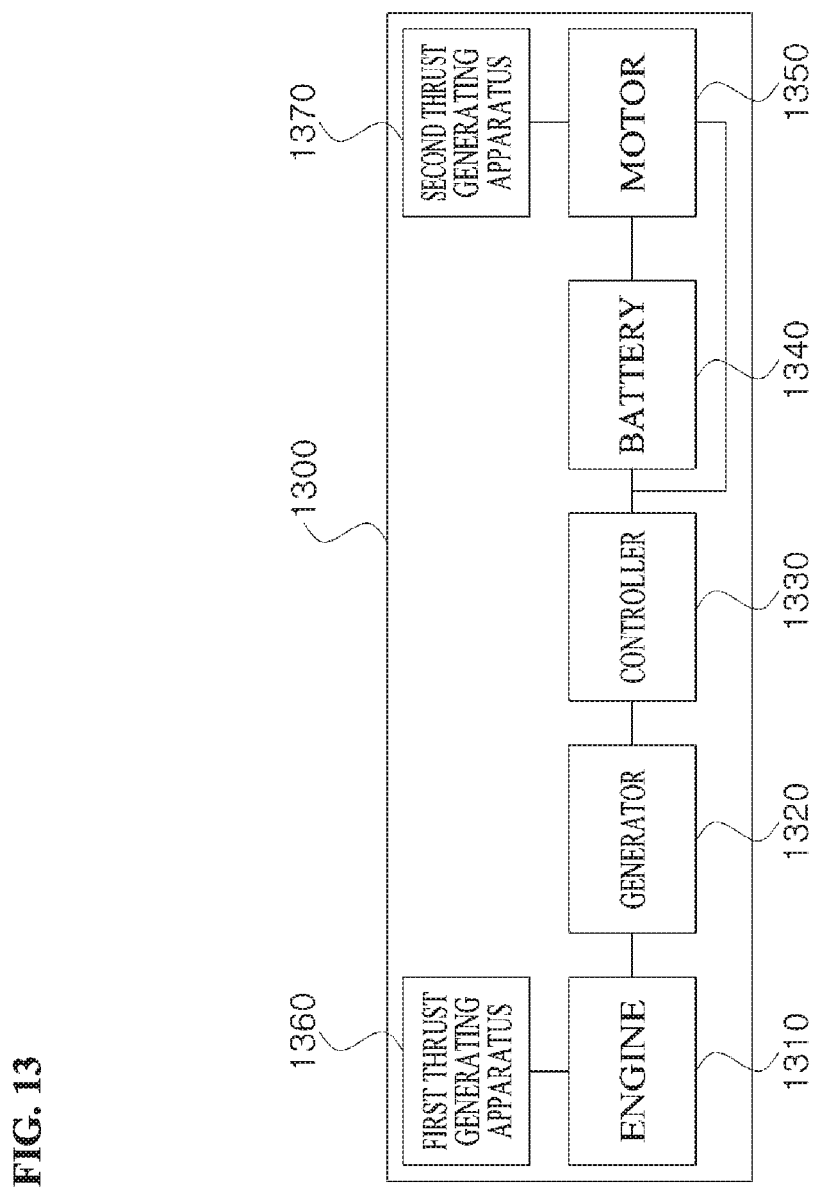
FIG. 13 is a block diagram showing a propulsion system of a mixed type hybrid vertical take-off and landing aircraft according to an embodiment.

FIG. 13 is a block diagram showing a propulsion system of a mixed type hybrid vertical take-off and landing aircraft according to an embodiment.

Referring to FIG. 13, a propulsion system 1300 of the hybrid vertical take-off and landing aircraft may include an engine 1310, a generator 1320, a controller 1330, a battery 1340, a motor 1350, a first thrust generating apparatus 1360, and a second thrust generating apparatus 1370. In an embodiment, the above descriptions of the hybrid vertical take-off and landing aircraft with reference to FIGS. 1 to 3 may be applied to the propulsion system 1300 of the hybrid vertical take-off and landing aircraft of FIG. 13.

The engine 1310 may burn fuel to generate mechanical power and may supply the generated power to the generator 1320. In an embodiment, the engine 1310 may supply power to the generator 1320 and supply power to the first thrust generating apparatus 1360. The engine 1310 may also supply power to the generator 1320 and the first thrust generating apparatus 1360 at the same time. The generator 1320 may produce electric power using the power supplied from the engine 1310. In an embodiment, the generator 1320 may be an integrated starter and generator (ISG). The ISG may produce AC electric power using the power supplied from the engine 1310.

The battery 1340 may store the electric power produced by the generator 1320. In this case, the electric power stored in the battery 1340 may be DC electric power. The battery 1340 may supply electric power to the motor 1350 according to the control of the controller 1330.

The first thrust generating apparatus 1360 may be directly connected with the engine 1310 and may generate thrust using the power supplied by the engine 1310. Thus, the first thrust generating apparatus 1360 may be driven using fuel other than electricity as a power source. In an embodiment, the position of the first thrust generating apparatus 1360 may be fixed or variable. Here, the positions of the first thrust generating apparatus 1360 and the second thrust generating apparatus 1370 do not refer to absolute positions of the first thrust generating apparatus 1360 and the second thrust generating apparatus 1370, and thus may be defined as directions in which axes of rotation (or centers) of the first thrust generating apparatus 1360 and the second thrust generating apparatus 1370 are directed. Also, as an example, the first thrust generating apparatus 1360 may be installed at the head of the hybrid vertical take-off and landing aircraft. As an example, the rotary wing 1130 of FIG. 11 may be included in the first thrust generating apparatus 1360.

The second thrust generating apparatus 1370 may be driven by the motor 1350 to generate thrust. In this case, the second thrust generating apparatus 1370 may be provided as at least one apparatus. As an example, the second rotary wings 1231, 1232, and 1233 of FIG. 12 may be included in the second thrust generating apparatus 1370. Also, the position of the second thrust generating apparatus 1370 may be variable.

The motor 1350 may receive at least one of electric power stored in the battery 1340 and electric power produced by the generator 1320 but not stored in the battery 1340 and may provide the power to the second thrust generating apparatus 1370. The motor 1350 may receive required power indicating electric power supplied to the motor 1350 according to the control of the controller 1330. In an embodiment, the motor 450 may be a brushless DC electric motor (BLDC motor) or a permanent-magnet synchronous motor (PMSM).

The controller 1330 may control the position of the first thrust generating apparatus 1360 or the second thrust generating apparatus 1370 to be variable. For example, the controller 1330 may move the position of the first thrust generating apparatus 1360 or the second thrust generating apparatus 1370, that is, the direction of the axis of rotation of the first thrust generating apparatus 1360 or the second thrust generating apparatus 1370 between a first direction from the tail of the hybrid vertical take-off and landing aircraft to the head of the hybrid vertical take-off and landing aircraft and a second direction that is an upward direction perpendicular to the first direction. Here, the first direction may refer to a forward direction in which the hybrid vertical take-off and landing aircraft flies, and the second direction may refer to an upward direction that is perpendicular to the forward direction in which the hybrid vertical take-off and landing aircraft flies. Here, the axis of rotation of the first thrust generating apparatus 1360 or the second thrust generating apparatus 1370 being directed in the first direction may be defined as a first position of the first thrust generating apparatus 1360 or the second thrust generating apparatus 1370, and the axis of rotation of the first thrust generating apparatus 1360 or the second thrust generating apparatus 1370 being directed in the second direction may be defined as a second position of the first thrust generating apparatus 1360 or the second thrust generating apparatus 1370.

Also, the controller 1330 may control the engine 1310 to supply power to at least one of the first thrust generating apparatus 1360 and the generator 1320.

In an embodiment, when the position of the first thrust generating apparatus 1360 is fixed and the position of the second thrust generating apparatus 1370 is variable, the first thrust generating apparatus 1360 may generate thrust in a horizontal direction, and the second thrust generating apparatus 1370 may generate thrust in a horizontal direction or vertical direction according to the position. Thus, when the hybrid vertical take-off and landing aircraft is flying vertically, the controller 1330 may control the second thrust generating apparatus 1370 to be driven. When the hybrid vertical take-off and landing aircraft is flying horizontally, the controller 1330 may control the first thrust generating apparatus 1360 and the second thrust generating apparatus 1370 to be driven together.

Also, in an embodiment, the controller 1330 may control the engine 1310 to supply power to the first thrust generating apparatus 1360 on the basis of at least one of a horizontal movement distance over which the hybrid vertical take-off and landing aircraft should move for a predetermined time, a vertical movement distance, and a ratio of the horizontal movement distance and the vertical movement distance. As an example, during a time period in which the vertical movement distance is greater than the horizontal movement distance and the ratio of the horizontal movement distance and the vertical movement distance is greater than a threshold ratio, the hybrid vertical take-off and landing aircraft may fly vertically. Since the first thrust generating apparatus 1360 may generate thrust in a horizontal direction, the controller 1330 may control the engine 1310 not to supply the power to the first thrust generating apparatus 1360 during the time period. As another example, during a time period in which the vertical movement distance is equal to or less than the horizontal movement distance and the ratio of the horizontal movement distance and the vertical movement distance is greater than a threshold ratio, the hybrid vertical take-off and landing aircraft may fly horizontally. Since the first thrust generating apparatus 1360 may generate thrust in a horizontal direction and the second thrust generating apparatus 1370 may generate thrust in a horizontal direction or a vertical direction according to the position, the controller 1330 may control the engine 1310 to supply power to at least one of the first thrust generating apparatus 1360 and the generator 1320 during the time period.

Also, in an embodiment, the controller 1330 may change the position of the second thrust generating apparatus 1370 on the basis of at least one of a horizontal movement distance over which the hybrid vertical take-off and landing aircraft should move for a predetermined time, a vertical movement distance, and a ratio of the horizontal movement distance and the vertical movement distance. As an example, during a time period in which the vertical movement distance is greater than the horizontal movement distance and the ratio of the horizontal movement distance and the vertical movement distance is greater than a threshold ratio, the controller 1330 may change the direction in which the rotation angle of the second thrust generating apparatus 1370 is directed to the second direction. Thus, the second thrust generating apparatus 1370 may generate thrust in a vertical direction. As another example, during a time period in which the vertical movement distance is equal to or less than the horizontal movement distance or when the ratio of the horizontal movement distance and the vertical movement distance is equal to or less than a threshold ratio, the controller 1330 may change the direction in which the rotation angle of the second thrust generating apparatus 1370 is directed to the first direction. Thus, the second thrust generating apparatus 1370 may generate thrust in a horizontal direction.

In an embodiment, the controller 1330 may receive a piloting signal of the hybrid vertical take-off and landing aircraft through a communication interface. Here, the piloting signal may include a piloting instruction that controls acceleration, deceleration, altitude variation, target altitude, target speed, or target acceleration. The controller 1330 may extract a piloting instruction from the piloting signal and may estimate a horizontal movement distance, a vertical movement distance, and a ratio of the horizontal movement distance and the vertical movement distance from the piloting instruction.

Also, the controller 1330 may detect a first period, a second period, and a third period from an entire flight time of the hybrid vertical take-off and landing aircraft. Here, the first period may refer to a period in which thrust is generated by the first thrust generating apparatus 1360, the second period may refer to a period in which thrust for vertical movement is generated by the second thrust generating apparatus 1370, and the third period may refer to a period in which thrust for horizontal movement is generated by the second thrust generating apparatus 1370.

In an embodiment, the controller 1330 may detect the first period on the basis of whether the engine 1310 supplies power to the first thrust generating apparatus 1360. For example, the controller 1330 may determine a period in which the engine 1310 supplies power to the first thrust generating apparatus 1360 as the first period out of the entire flight time and may exclude a period in which the engine 1310 does not supply the power to the first thrust generating apparatus 1360 from the first period.

Also, the controller 1330 may detect the second period and the third period on the basis of the position of the second thrust generating apparatus 1370. The controller 1330 may determine a period in which the axis of rotation of the second thrust generating apparatus 1370 is directed in the second direction as the second period and may determine a period in which the axis of rotation of the second thrust generating apparatus 1370 is directed in the first direction as the third period. The controller 1330 may perform a control such that an overlap period between the first period and the second period is shorter than an overlap period between the first period and the third period. Thus, the thrust of the hybrid vertical take-off and landing aircraft may be distributed and thus efficiently generated, thus enhancing flight efficiency of the hybrid vertical take-off and landing aircraft.

In an embodiment, the controller 1330 may determine the amount of power supplied to the generator 1320 by the engine 1310 on the basis of the amount of electric power stored in the battery 1340 and may determine the amount of power supplied to the first thrust generating apparatus 1360 by the engine 1310 on the basis of the amount of power supplied to the generator 1320 by the engine 1310. For example, for the case in which that the battery 1340 may store electric power of 2.5 kW, when the electric power stored in the battery 1340 is 2.0 kW, the controller 1330 may control the engine 1310 to deliver 70% of the maximum output power to the generator 1320 and may control the engine 1310 to deliver 30% of the maximum output power to the first thrust generating apparatus 1360. Also, when the electric power stored in the battery 1340 is 2.0 kW, the generator 1320 does not need to supply the electric power to the battery 1340. Thus, the controller 1330 may control the engine 1310 to deliver 70% of the maximum output power to the generator 1320 and may control the engine 1310 to deliver 30% of the maximum output power to the first thrust generating apparatus 1360.

Also, the controller 1330 may determine required power on the basis of the current position of the second thrust generating apparatus 1370. Since the controller 1330 can control the position of the second thrust generating apparatus 1370, the controller 1330 may confirm the most recent control command that controlled the position of the second thrust generating apparatus 1370 to confirm the current position of the second thrust generating apparatus 1370. Also, the controller 1330 may confirm information regarding the current position of the second thrust generating apparatus 1370 from the second thrust generating apparatus 1370.

With the same amount of electric power supplied to the motor 1350, a flight distance of the hybrid vertical take-off and landing aircraft may vary according to the current position of the second thrust generating apparatus 1370. Thus, the controller 1330 may determine output power of the motor 1350 and may determine required power corresponding to the output power of the motor 1350 on the basis of the current position of the second thrust generating apparatus 1370.

Also, the controller 1330 may determine the amount of power supplied to the generator 1320 by the engine 1310 on the basis of the amount of electric power stored in the battery 1340 and the required power. For example, when the required power is 4 kW and the electric power stored in the battery 1340 is 2.5 kW, the generator 1320 may produce electric power of 1.5 kW. In this case, the controller 1330 may control the engine 1310 to deliver 60% of the maximum output power to the generator 1320 and deliver 40% of the maximum output power to the first thrust generating apparatus 1360. Also, when the required power is 3 kW and the electric power stored in the battery 1340 is 2.5 kW, the generator 1320 may produce electric power of 0.5 kW. In this case, the controller 1330 may control the engine 1310 to deliver 30% of the maximum output power to the generator 1320 and deliver 70% of the maximum output power to the first thrust generating apparatus 1360.

In an embodiment, the controller 1330 may include an electric power controller. The electric power controller may control the generator 1320 to control the amount of produced electric power and convert the electric power produced by the generator 1320 into DC electric power. As an example, the electric power controller may include a converter (e.g., 3-phase inverter), which may convert AC electric power produced by the generator 1320 into DC electric power. Also, the electric power controller may supply the DC electric power to the battery 1340 or may supply the DC electric power to the motor 1350.

Also, in an example of FIG. 13, the controller 1330 may be represented as one unit. However, the controller 1330 may be composed of a first controller and a second controller. Also, embodiments of the present invention are not limited thereto. The controller 1330 may be composed of a plurality of units. As an example, the first controller may correspond to the controller 250 of FIG. 2, and the second controller may correspond to the electric power controller 240 of FIG. 2.

Also, the controller 1330 may enable a flight using only the electric power stored in the battery 1340. For example, the controller 1330 may enter the silence mode that supplies only the electric power stored in the battery 1340 to the motor 1350. In this case, the controller 1330 may control the engine 1310 to stop the engine 1310 and thus stop supplying power to the generator 1320 and the first thrust generating apparatus 1360 of the engine 1310. Thus, the controller 1330 may supply the electric power stored in the battery 1340 to the motor 1350.

Figure 14:
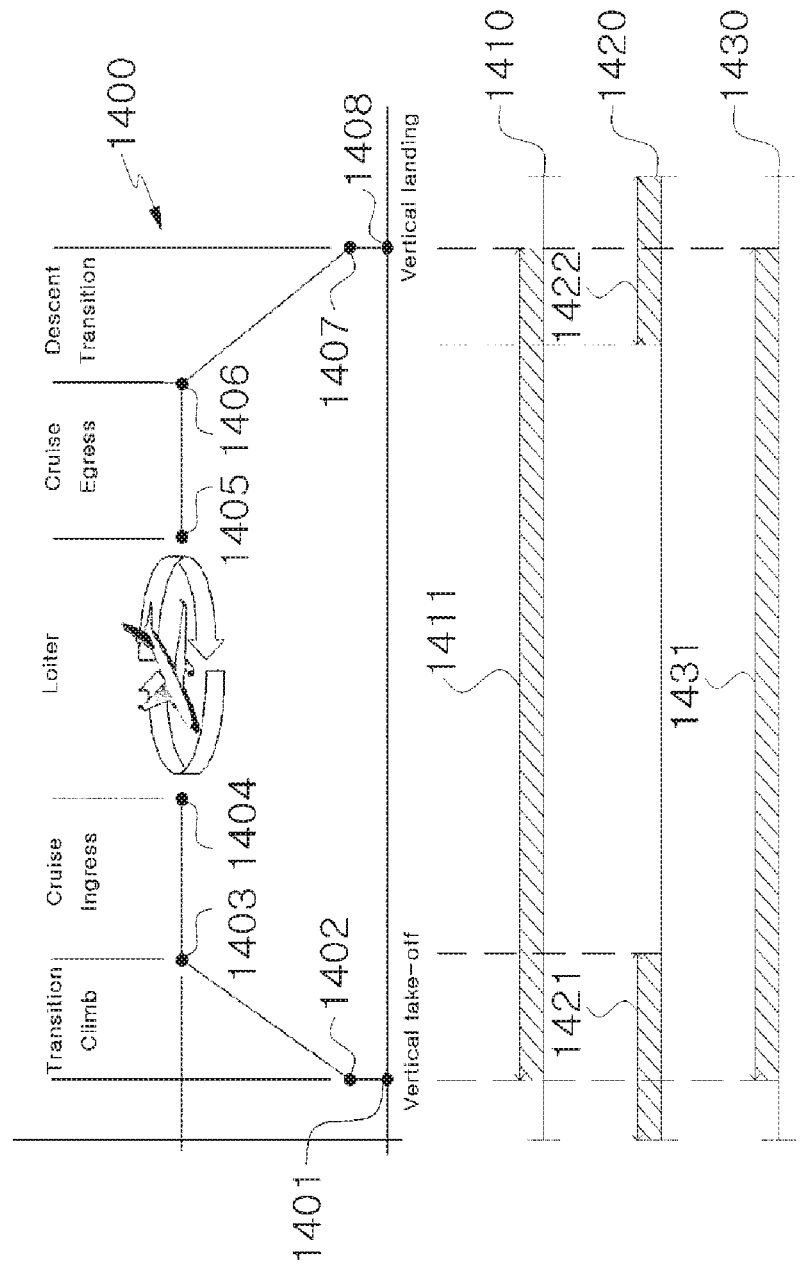
FIG. 14 is a diagram for describing first to third periods according to an embodiment.

FIG. 14 is a diagram for describing first to third periods according to an embodiment.

Referring to FIG. 14, a horizontal axis of a graph of FIG. 1400 may represent range, and a vertical axis may represent altitude. The horizontal axes of the graphs 1410 to 1430 may represent time. It is assumed that the hybrid vertical take-off and landing aircraft in FIG. 14 is the same as the hybrid vertical take-off and landing aircraft 1210 shown in FIG. 12. In time points 1401 to 1408, the hybrid vertical take-off and landing aircraft may control the first thrust generating apparatus that receives power from the engine and the second thrust generating apparatus that receives power by the motor to make a flight. In this case, the motor may receive at least one of the electric power stored in the battery and the electric power produced by the generator but not stored in the battery. The hybrid vertical take-off and landing aircraft may take off vertically from time point 1401 to time point 1402 and may make a climbing flight from time point 1402 to time point 1403. Thus, the hybrid vertical take-off and landing aircraft may fly vertically from time point 1401 to time point 1402 and may fly vertically and horizontally at the same time from time point 1402 to time point 1403. The hybrid vertical take-off and landing aircraft may make a cruising flight from time point 1403 to time point 1404, make a loitering flight from time point 1404 to time point 1405, and make a cruising flight from time point 1405 to time point 1406. Thus, the hybrid vertical take-off and landing aircraft may fly horizontally from time point 1403 to time point 1406. The hybrid vertical take-off and landing aircraft may make a descent flight from time point 1406 to time point 1407 and may land vertically from time point 1407 to time point 1408. Thus, the hybrid vertical take-off and landing aircraft may fly vertically and horizontally at the same time from time point 1406 to time point 1407 and may fly vertically from time point 1407 to time point 1408.

The first thrust generating apparatus may generate thrust when the hybrid vertical take-off and landing aircraft is flying horizontally. Thus, as shown in the graph 1410, the first period in which thrust is generated by the first thrust generating apparatus may be detected as the period between time point 1402 and time point 1407.

Also, the second thrust generating apparatus may generate thrust for vertical movement when the hybrid vertical take-off and landing aircraft is flying vertically. Thus, as shown in the graph 1420, the second period in which thrust for vertical movement is generated by the second thrust generating apparatus may be detected as the period between time point 1401 and time point 1403 and the period between time point 1406 and time point 1408.

Also, the second thrust generating apparatus may generate thrust for horizontal movement when the hybrid vertical take-off and landing aircraft is flying horizontally. Thus, as shown in the graph 1430, the third period in which thrust for horizontal movement is generated by the second thrust generating apparatus may be determined as the period between time point 1402 and time point 1407.

Accordingly, as shown in the graphs 1410 to 1430, the hybrid vertical take-off and landing aircraft may fly such that an overlap period between the first period and the second period is shorter than an overlap period between the first period and the third period.

Figure 15:
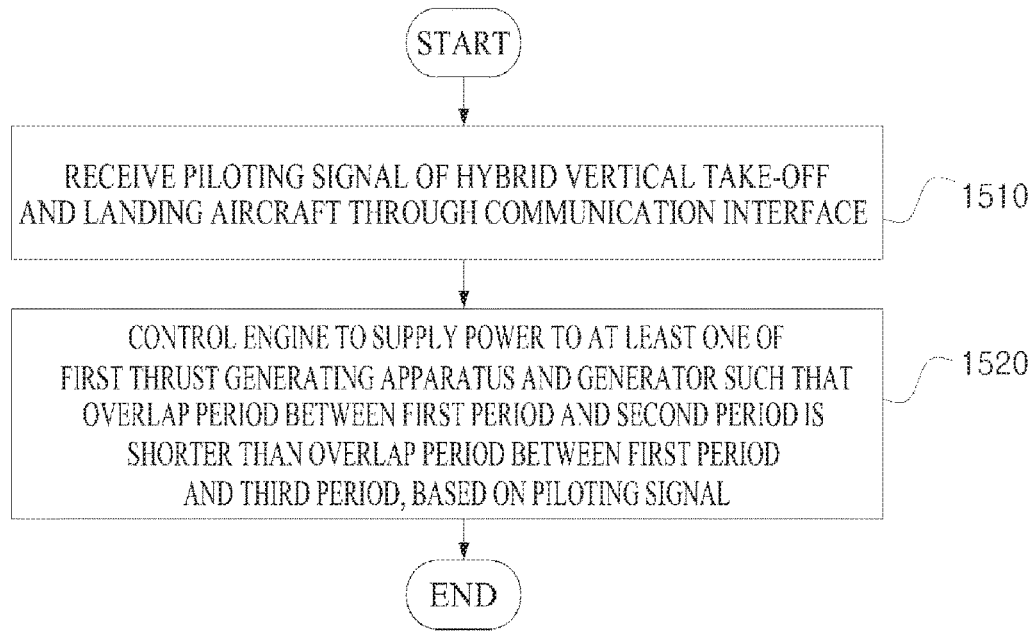
FIG. 15 is an operational flowchart for describing a method of controlling a mixed type hybrid vertical take-off and landing aircraft according to an embodiment.

FIG. 15 is an operational flowchart for describing a method of controlling a mixed type hybrid vertical take-off and landing aircraft according to an embodiment.

Referring to FIG. 15, the hybrid vertical take-off and landing aircraft may receive a piloting signal of the hybrid vertical take-off and landing aircraft through a communication interface (1510).

Also, the hybrid vertical take-off and landing aircraft may control the engine to supply power to at least one of the first thrust generating apparatus and the generator such that the overlap period between the first period and the second period is shorter than the overlap period between the first period and the third period, on the basis of the piloting signal (1520). Here, the first period may indicate a period in which thrust is generated by a first thrust generating apparatus that receives power from the engine, the second period may indicate a period in which thrust for vertical movement is generated by at least one second thrust generating apparatus which is driven by the motor and whose position is variable, and the third period may indicate a period in which thrust for horizontal movement is generated by the second thrust generating apparatus. Also, the engine may supply power to at least one of the first thrust generating apparatus and the generator, and the generator may produce electric power using the power supplied by the engine and supply the produced electric power to the motor or the battery. Also, the motor may receive at least one of the electric power stored in the battery and the electric power produced by the generator but not stored in the battery and may provide the power to the second thrust generating apparatus.

The above descriptions with reference to FIGS. 1 to 14 may be applied to the method of controlling electric power of the hybrid vertical take-off and landing aircraft shown in FIG. 15, and thus a detailed description thereof will be omitted.

The method according to an embodiment may be implemented as program instructions executable by a variety of computers and recorded on a computer-readable medium. The computer-readable medium may also include a program instruction, a data file, a data structure, or combinations thereof. The program instruction recorded on the recording medium may be designed and configured specifically for an embodiment or can be publicly known and available to those who are skilled in the field of computer software. Examples of the computer-readable medium include a magnetic medium, such as a hard disk, a floppy disk, and a magnetic tape, an optical medium, such as a CD-ROM, a DVD, etc., a magneto-optical medium such as a floptical disk, and a hardware device specially configured to store and perform program instructions, for example, a ROM, RAM, flash memory, etc. Examples of the program instruction include not only machine code generated by a compiler or the like but also high-level language codes that may be executed by a computer using an interpreter or the like. The above exemplary hardware device can be configured to operate as one or more software modules in order to perform the operation of an embodiment, and vice versa.

Although the present disclosure has been described with reference to specific embodiments and features, it will be appreciated that various variations and modifications can be made from the disclosure by those skilled in the art. For example, suitable results may be achieved if the described techniques are performed in a different order and/or if components in a described system, architecture, device, or circuit are combined in a different manner and/or replaced or supplemented by other components or their equivalents.

Accordingly, other implementations, embodiments, and equivalents are within the scope of the following claims.

What is claimed is:

1. A hybrid aircraft comprising:
   an engine;
   a generator configured to produce electric power using power supplied by the engine;
   a battery configured to store the electric power produced by the generator;
   at least one thrust generating apparatus whose position is variable;
   a motor configured to receive at least one of the electric power stored in the battery and electric power produced by the generator but not stored in the battery and provide the power to at least one thrust generating apparatus; and
   a controller configured to acquire the current position of the at least one thrust generating apparatus, determine required power indicating electric power supplied to the motor based on the current position of the at least one thrust generating apparatus, and determine the amount of the electric power stored in the battery and the electric power produced by the generator but not stored in the battery among the electric power supplied to the motor based on the determined required power.

2. The hybrid aircraft of claim 1, wherein the current position of the thrust generating apparatus is varied depending on the direction of the axis of rotation of the thrust generating apparatus.

3. The hybrid aircraft of claim 2, wherein the controller configured to control the thrust generating apparatus such that the direction of the axis of rotation of the thrust generating apparatus is changed between a first direction from the tail of the hybrid aircraft to the head of the hybrid aircraft and a second direction that is an upward direction perpendicular to the first direction.

4. The hybrid aircraft of claim 1, wherein the controller configured to control the thrust generating apparatus such that the direction of the axis of rotation of the thrust generating apparatus is changed to the second position when the hybrid aircraft takes off or lands vertically.

5. The hybrid aircraft of claim 3, wherein the controller configured to control the thrust generating apparatus such that the direction of the axis of rotation of the thrust generating apparatus is changed to the first position when the hybrid aircraft is in as level flight.

6. The hybrid aircraft of claim 3, wherein the controller configured to control the thrust generating apparatus such that the direction of the axis of rotation of the thrust generating apparatus is changed from the second direction to the first direction according to at least one of altitude and flight speed of the hybrid aircraft when the hybrid aircraft climbs, and wherein the controller configured to control the thrust generating apparatus such that the direction of the axis of rotation of the thrust generating apparatus is changed from the first direction to the second direction according to the at least one of altitude and flight speed when the hybrid aircraft descends.

7. The hybrid aircraft of claim 3, wherein the controller configured to receive a piloting signal for the hybrid aircraft through a communication interface, control the output power of the motor by considering the current position of the thrust generating apparatus according to the piloting signal, and determine the required power based on the output power of the motor.

8. The hybrid aircraft of claim 7, wherein the controller configured to control the output power of the motor according to the piloting signal based on the amount of electric power required by the motor that varies depending on the current position of the thrust generating apparatus.

9. The hybrid aircraft of claim 7, wherein the controller configured to control the output power of the motor such that the hybrid aircraft reaches at least one of target altitude, target speed, and target acceleration included in the piloting signal based on the current position of the thrust generating apparatus.

10. The hybrid aircraft of claim 1, wherein the controller configured to control to supply only the electric power stored in the battery to the motor, supply only the electric power produced by the generator but not stored in the battery to the motor, or supply both the electric power stored in the battery and the electric power produced by the generator but not stored in the battery to the motor according to the determined amount of the electric power stored in the battery and the electric power produced by the generator but not stored in the battery.

11. The hybrid aircraft of claim 1, wherein the controller configured to control to supply the electric power produced by the generator but not stored in the battery to motor preferentially over the power stored in the battery.

12. The hybrid aircraft of claim 11, wherein the controller configured to control to supply all of the electric power produced by the generator but not stored in the battery to the motor, and supply the electric power corresponding to a difference between the amount of electric power produced by the generator but not stored in the battery and the amount of required power out of the electric power stored in the battery to the motor when the amount of required power is greater than the amount of electric power produced by the generator but not stored in the battery.

13. The hybrid aircraft of claim 11, wherein the controller configured to control to supply only the electric power produced by the generator but not stored in the battery to the motor when the amount of required power is equal to the amount of electric power produced by the generator but not stored in the battery.

14. The hybrid aircraft of claim 11, wherein the controller configured to control to supply only the electric power produced by the generator but not stored in the battery, and store, in the battery, the remaining electric power that electric power other than the electric power supplied to the motor among the electric power produced by the generator but not stored in the battery when the amount of required power is less than the amount of electric power produced by the generator but not stored in the battery.

15. The hybrid aircraft of claim 1, wherein the controller configured to control to supply the electric power produced by the generator but not stored in the battery to motor preferentially over the power stored in the battery when the hybrid aircraft lands.

16. The hybrid aircraft of claim 1, wherein the controller further comprises:
   a first controller configured to acquire the current position of the at least one thrust generating apparatus and determine the required power based on current position of the at least of thrust generating apparatus; and
   a second controller configured to determine the amount of the electric power stored in the battery and the electric power produced by the generator but not stored in the battery among the electric power supplied to the motor based on the determined required power.

17. The hybrid aircraft of claim 16, wherein the generator comprises an integrated starter and generator (ISG), and wherein the integrated starter and generator configured to produce AC electric power using the power supplied from the engine.

18. The hybrid aircraft of claim 17, wherein the second controller comprises a converter configured to convert the AC electric power into DC electric power, and wherein the second controller configured to store at least a part of the converted DC electric power in the battery, and supply the electric power but not stored in the battery among the converted DC electric power to the motor.

19. A method of controlling a hybrid aircraft, the method comprising:
- acquiring a current position of at least one thrust generating apparatus of the hybrid aircraft whose position is variable;
- determining required power according to a flight state based on the current position of the at least one thrust generating apparatus; and
- determining the amount of first electric power and the amount of second electric power among the electric power supplied to the motor that provides power to the at least one thrust generating apparatus based on the required power,
- wherein the first electric power comprises electric power stored in the battery from electric power produced by the generator using a power supplied by the engine, and the second electric power comprises electric power not stored in the battery from the electric power produced by the generator.

20. A non-transitory computer-readable recording medium having recorded thereon a program for executing the method of claim 19.

\* \* \* \* \*